United States Patent [19]

Wight et al.

[11] Patent Number: 5,239,598

[45] Date of Patent: * Aug. 24, 1993

[54] ELECTRO-OPTIC WAVEGUIDE DEVICE

[75] Inventors: David R. Wight, Malvern Wells; John M.Heaton; Meirion F. Lewis, both of Malvern; Christopher L. West, Malvern Wells, all of England

[73] Assignee: The Secretary of State for Defence in Her Britannic Majesty's Government of the United Kingdom of Great Britain and Northern Ireland, London, England

[*] Notice: The portion of the term of this patent subsequent to Jan. 21, 2009 has been disclaimed.

[21] Appl. No.: 746,343

[22] Filed: Aug. 16, 1991

Related U.S. Application Data

[63] Continuation of Ser. No. 488,042, May 22, 1990, Pat. No. 5,082,342.

[30] Foreign Application Priority Data

Nov. 20, 1987 [GB] United Kingdom ............... 8727212

[51] Int. Cl.[5] ............................. G02B 6/00; G02B 6/10
[52] U.S. Cl. ............................. 385/8; 372/44; 385/4; 257/431
[58] Field of Search ............................. 385/8–10, 385/4; 372/144; 357/17, 30

[56] References Cited

U.S. PATENT DOCUMENTS 4,778,235 10/1988 Fujiwara ............................. 350/96.13
5,082,342 1/1992 Wight et al. ............................. 385/8

OTHER PUBLICATIONS

Applied Optics, vol. 25, No. 9, May 1986, (New York, US) H. Inoue et al: "Switching Characteristics of GaAs Directional Coupler Optical (con't) Switches", pp. 1484–1490.
Electronics Letters, vol. 23, No. 20, Sep. 24, 1987, (Stevenage, Herts, GB) J. H. Abeles et al: "Integration of GaAs MESFET Drivers with GaAs (con't) Directional-Coupler Electrooptic Modulators", pp. 1037–1038.
Journal of Lightwave Technology, vol. LT-5, No. 10, Oct. 10, 1987, R. Walker: "High-Speed Electrooptic Modulation in GaAs/GaAlAs (cont) Waveguide Devices", pp. 1444–1453.
Journal of Applied Physics, vol. 50, No. 8, Aug. 1979 (New York, US) A. Carenco et al: "Multiwavelength GaAs Rib Waveguide Directional–(cont) Coupler Switch With 'Stepped $\Delta\beta$' Schottky Electrodes", pp. 5139–5141.
"Opto-electronic Technology and Lightwave Communications Systems" Edited by Chinlon Lin, Van Nostrand Reinhold 1989 Code No. (con't) ISBON 0-42-2-216050-4, pp. 583-584.
NASA Report No. JPL D-1885, "Electro Optic Phase Modulator Array" by J. Katz et al, Jet Propulsion Laboratory, CA Institute of Technology.

*Primary Examiner*—Akm E. Ullah
*Attorney, Agent, or Firm*—Nixon & Vanderhye

[57] ABSTRACT

An electro-optic waveguide device (10) comprises an assembly of waveguides (30) connected to a common light input region (41) and forming a common far field diffraction pattern (44). The device (10) comprises an n+ GaAs substrate (14) bearing a waveguide lower cladding layer (16) of n+ $Ga_{0.9}Al_{0.1}As$, which is in turn surmounted by a waveguide core layer (18) of n−GaAs. The layer (18) has grooves (20) defining the waveguides (30), each of which has a respective Schottky contact (32). Each contact (32) is biased negative with respect to the substrate (14), which reverse biases the respective Schottky diode waveguide structure. The waveguide core layer (18) has electro-optic properties, and its refractive index varies with electric field. The phase of light emerging from each waveguide is therefore independently variable by means of its applied bias voltage. The waveguides (30) are arranged to provide output confined very largely to lowest order spatial modes, so that they produce a single far field diffraction pattern (44). Varying the set of bias voltages applied to the waveguides (30) produces output phase variation which changes the position of the diffraction pattern principal maximum (46) to produce beam steering.

26 Claims, 17 Drawing Sheets

1015X

4000X

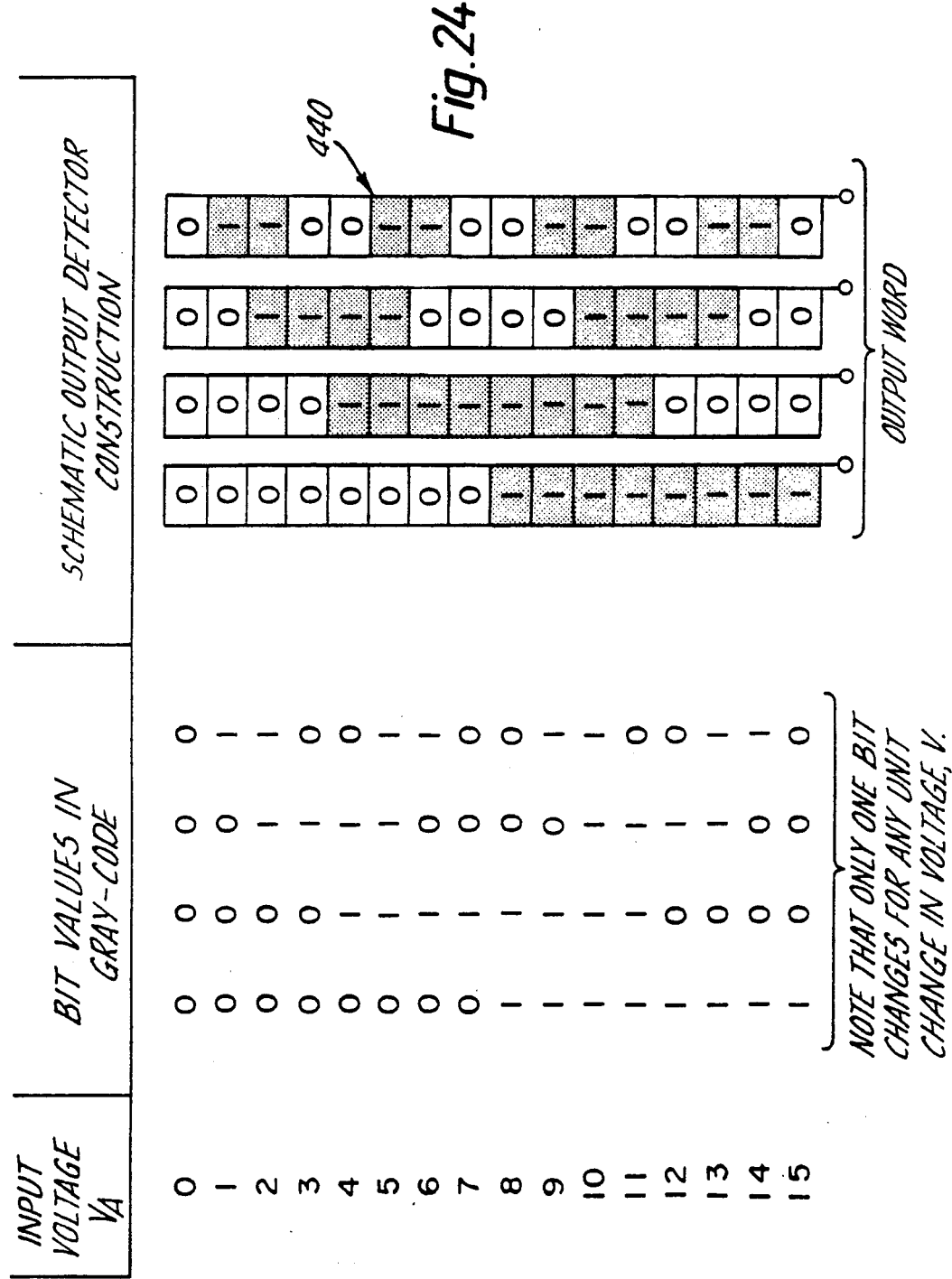

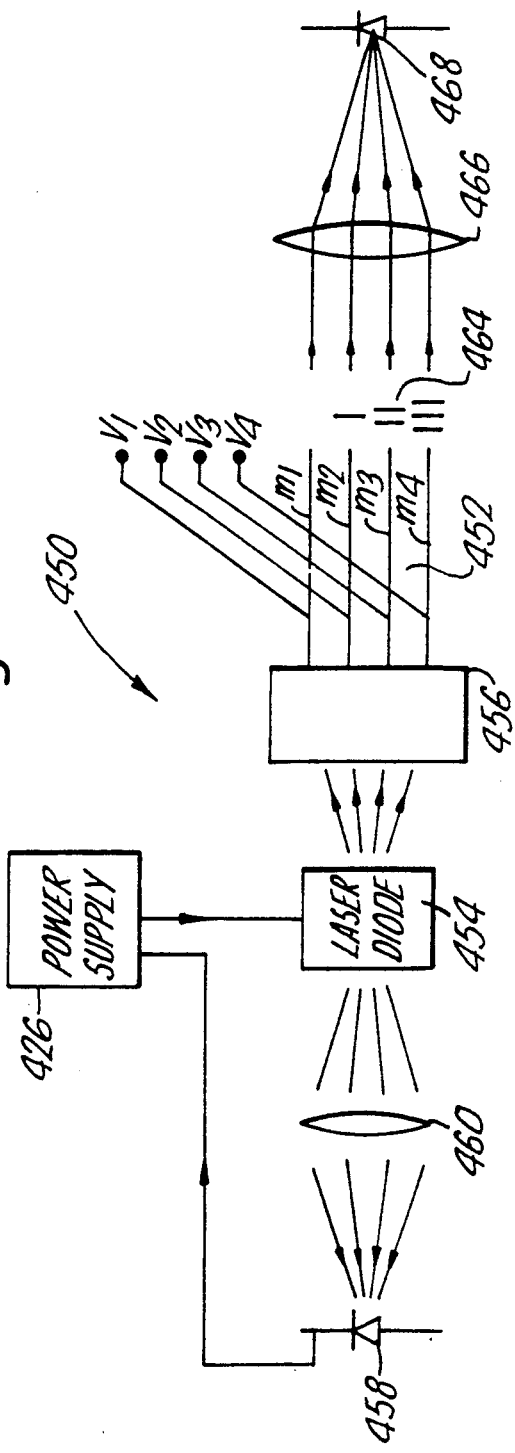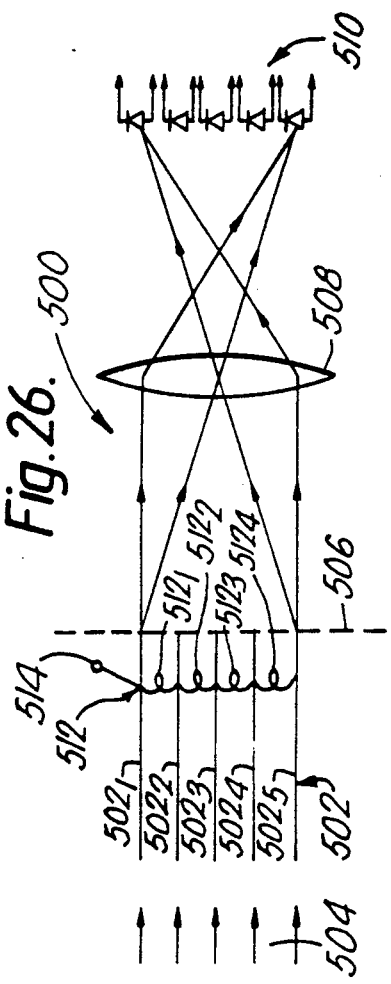

ELECTRO-OPTIC WAVEGUIDE DEVICE

This is a continuation of U.S. patent application Ser. No. 07/488,042, filed May 22, 1990 now U.S. Pat. No. 5,082,342.

BACKGROUND OF THE INVENTION

1. Field of the Invention

This invention relates to an electro-optic waveguide device of the kind appropriate inter alia for optical beam steering applications.

2. Discussion of Prior Art

Optical beam steering devices based on electro-mechanical movements are well known in the prior art. A typical arrangement comprises a mirror mounted on a current-actuates moving coil. Electro-mechanical systems are inherently limited to low response frequencies up to the order of 1 kHz.

Acousto-optic beam steering devices are also known, such as for example that described by Suhara, Nozaki and Nishihara in the Proceedings of the IVth European Conference on Integrated Optics. This comprises a Ti-doped $LiNbO_3$ optical waveguide having an interdigital acoustic transducer and a light focussing diffraction grating coupler its upper surface. The grating coupler is curved and has varying (chirped) spatial frequency to provide light output focussing. A radio frequency (RF) signal is applied to the transducer, which produces surface acoustic waves in the waveguide transverse to the light propagation direction. The acoustic waves modulate the waveguide refractive index and thereby interact with light propagation. The output focus from the grating coupler is raster scanned or beam steered by frequency sweeping the RF signal applied to the transducer, deflection angle being approximately proportional to frequency. The transducer had a center frequency of about 500 MHz and a bandwidth of 330 MHz. This beam steering apparatus is of high optical resolution. However, the maximum rate at which the output beam can be steered depends on the rate of propagation of acoustic waves from the transducer across the waveguide, and is in the order of 1 MHz. Moreover, frequency swept RF signal sources are expensive, and are difficult to interface with digital electronic circuitry. In order to achieve beam positioning in response to digital signals, it would be necessary to provide circuitry for converting the signals into RF frequencies within the acoustic transducer bandwidth.

An electro-optic beam steering device is described by R A Meyer in Applied Optics, Vol. 11, pages 613–616, March 1972. It comprises an $LiTaO_3$ crystal in the form of a rectangular block 0.1 mm thick, 23 mm wide and 15 mm long. One 23 mm×15 mm fact of the crystal bears 46 parallel electrodes each 0.2 mm wide and with a center-to-center spacing of 0.5 mm. The electrodes length dimensions are parallel to that of the crystal. Parallel light is input to one 23 mm×0.1 mm crystal face and propagates parallel to electrode length. The crystal has electro-optic properties, and consequently its refractive index is a function of electrode voltage. Light output from the crystal is variable in optical phase in accordance with electrode voltage also. The light output form a crystal region immediately beneath the center of an electrode depends on electrode voltage. Because of electrical field non-uniformity at electrode edges and in inter-electrode regions, light propagating in corresponding parts of the crystal is non-uniformly phase modulated and changes its polarization state. The crystal is masked to restrict light output to central areas under electrodes. The mask comprises a linear array of 100 $\mu$m square apertures.

Meyer does not provide easily accessible information on the beam steering performance of his device, but it would appear that it is capable of steering a beam through about 0.2°. The limit of beam steering is set by the distance between grating lobes, these being individual diffraction maxima within the main lobe of a diffraction pattern arising form one element or mask aperture alone. The angular beam steering limit is inconveniently small. To obtain a useful degree of linear shift in beam position, a light reception surface would require location at a substantial distance from the device. Furthermore, the device is of inconveniently large dimensions, of the order of centimeters in extent. It is therefore a bulk optical component. It is unsuitable either for production by integrated techniques or for incorporation on a single semiconductor wafer with other electro-optic devices and integrated circuits.

Electro-optic waveguide devices for beam steering applications are described in published European Patent Application EPA 0130859 and British Patent No. GB 1592050. Each of these describes forming an array of individual optical waveguides in a block of electro-optic material. The waveguides are furnished with respective electrodes. The optical phase of light emergent from each waveguide is controlled by electrode voltage, since variation in voltage produces variation in waveguide refractive index and optical path length by virtue of the electro-optic properties of the block. The waveguide outputs constitute an array of coherent light sources with controllable phase relative to one another, and act as a set of diffraction apertures. They consequently provide a far field diffraction pattern like a diffraction grating, the pattern being formed at a distance from the waveguide outputs sufficiently large to produce overlap of their individual beams.

EPA 0130859 envisages formation of the waveguide array by diffusion of titanium into lithium niobate for operation in the visible and near infrared. The use of $Ga_xAl_{1-x}As$ is also mentioned. Waveguides are diffused into a block, which forms one common electrode. Each waveguide has a respective overlying second electrode. It is envisaged that about one hundred waveguides (91–101) would be required each longer than the corresponding second electrode. The (waveguide/electrode) interaction length would be 40 mm, and the electrode control voltage would be ±50 V. Assuming that FIG. 1 of this document is drawn approximately to scale, waveguides over 90 mm long spaced apart by over 17 mm are required. An array of one hundred waveguides would therefore be more than 1700 mm across, well over 1 meter. These parameters are calculated by scaling in proportion to electrode length, the only quoted size factor. The far field diffraction pattern can be shown to be formed at a minimum distance of between ten and one hundred times the width of a waveguide array of this kind, the distance varying with individual waveguide size. Consequently, insofar as it can be ascertained, EPA 0130859 appears to be disclosing a GaAlAs device in the order of meters in extent, and which forms a far field diffraction pattern tens of meters distant. This is far too large to be useful for the purposes of manufacturing integrated electro-optic circuits. In order to be compatible with conventional lithographic semiconductor processing, an electro-optic semiconductor device must be smaller in extent than 10 cm, the diameter of a typical semiconductor wafer. Furthermore, where the wafer is required to accommodate a waveguide array together with other components such as a light source and array outputs detectors, both the array and its far field diffraction pattern must be accommodated within the wafer dimensions. This is clearly quite impracticable with the EPA 0130859 device, since it is orders of magnitude too large. GB 1592050 discloses an electro-optic waveguide array formed by diffusing titanium into lithium niobate. The array has twenty optically discrete waveguides each 18 mm long and 8 μwide with a center-to-center spacing or pitch of 40 μm. Bias electrodes are arranged between adjacent waveguides, ie in the plane of the array. No performance figures are quoted. However, calculations indicate that, at a wavelength of the 1.06 μm, the far field diffraction pattern is not properly formed at a distance in air of 10 cm from the end of the device. This distance scales approximately with refractive index, and is therefore n times greater in a material of refractive index n. Prisms are employed for light input to and output from the device, so the device incorporates bulk optical components unsuitable for integrated optics purposes. GB 1592050 mentions the possibility of using GaAs to form the waveguide array. However, it does not address the problem of the physical size of a GaAs device. As is well known, the refractive index change per unit electric field in lithium niobate is more than ten times that in GaAs. Consequently, to obtain the beam steering properties, a GaAs device constructed in accordance with GB 1592050 would require waveguides about 20 cm long, ie twice the size of a conventional GaAs semiconductor wafer. The far field diffraction pattern in a GaAs medium would be over 30 cm from the waveguide ends. Integration of the device with other components such as deflected beam detectors would therefore require a semiconductor wafer over 50 cm in diameter, five times the diameter and twenty-five times the area of a conventional wafer.

GB 1592050 does not quote an operating wavelength, but lithium niobate is considered to be suitable for visible and near infrared use (see eg EPA 0130859). This implies a maximum free space operating wavelength of about 1 μm. The quoted device dimensions consequently correspond to waveguides at least 8λ wide with a center to center spacing of at least 40λ, where λ is the free space operating wavelength. In the center of the visible region, these parameters would be 16λ and 80λ respectively. The waveguide spacing is designed to ensure that there is no interaction of light in adjacent waveguides; ie the waveguides are required to be optically discrete. The device has a switching speed of the order of nanoseconds, which implies an operating frequency in the order of hundreds of MHz. At an operating wavelength of 1.06 μm, calculations show that the device produces an angular separation between adjacent diffraction maxima of about 1°. The device consequently has a beam scanning capability limited to this angle if ambiguity is to be avoided.

EPA 0130859 and GB 1592050 both suffer from the problem of electric field non-uniformity perpendicular to the light propagation direction. Both employ waveguides formed by diffusion into a block, and the former employs the block as one electrode and overlying planar metal as the other. The latter discloses electrodes either side of each waveguide on the block surface, across which the electric field appears. The electric field consequently diminishes with depth into the block. Neither of these electrode configurations appears capable of providing uniform electric field in the waveguides as required for uniform electro-optically induced phase change.

SUMMARY OF THE INVENTION

It is an object of the present invention to provide an alternative form of electro-optic waveguide device.

The present invention provides an electro-optic waveguide device of the kind comprising an array of electrically biasable waveguides of electro-optic material, and wherein:

(a) the device is of multilayer construction, and includes a waveguide core layer sandwiched between two light confinement layers of lower refractive index, (b) the waveguide core layer is part of a diode structure and is depletable of charge carriers under reverse bias applied via the confinement layers, (c) grooving extends at least partly through the waveguide core layer to define individual waveguides of the array, the grooving containing a medium with refractive index at least 1.5 less than that of the waveguide core layer to inhibit optical coupling between adjacent waveguides, and (d) the waveguides are arranged to inhibit output of unwanted spatial modes.

The invention provides the advantage that it is of greatly reduced size and improved performance compared to the prior art. By virtue of the layered diode structure, voltage drop is concentrated in the waveguide core layer. This provides a greatly enhanced electric field in each waveguide for a given bias voltage. Consequently, a given optical phase shift is achieved with very much shorter waveguides for a given voltage. Furthermore, The electric field is highly uniform, being directed through the waveguide core layer thickness. This avoids variation in electro-optic phase change across a waveguide cross-section. The grooving medium provides a substantial refractive index change adjacent each waveguide, which provides high optical isolation without the need for large waveguide spacing. The waveguides may therefore be more closely packed than in the prior art, where the refractive index change is less than 0.1. The device as a whole consequently has greatly reduced size. The invention may incorporate waveguides less than 5λ wide with a center to center spacing less than 20λ, where λ is a free space operating wavelength. One embodiment of the invention to be described incorporates a GaAs waveguide core layer with electro-refractive waveguides λ in width, 3λ in center spacing and 1.8 mm in length. It operates at λ = 1.06 μm. This device produces a far field diffraction pattern which is fully formed at a range less than 0.5 mm in air, or less than 1.8 mm in a GaAs medium. This embodiment and its far field diffraction pattern may therefore be easily accommodated with other components on a conventional semiconductor wafer, unlike the prior art. Furthermore, it exhibits unambiguous beam steering through up to 20° with waveguide voltages in the region of 20 V, an improvement of more than an order of magnitude over the prior art. Calculations indicate that this device is capable of beam steering rates well in excess of 1 GHz.

In a preferred embodiment, the grooving medium is air (n = 1) and the invention is at least partly constructed of successively disposed semiconductor material layers each of the $Ga_xAl_{1-x}As$ system (n>3). This provides a refractive index change greater than 2 at waveguide/groove interfaces, and allows closer waveguide spacing without an unacceptable degree of optical coupling between adjacent waveguides.

The diode structure may be of the Schottky barrier variety, in which case one light confinement layer may be metal forming a Schottky contact with the waveguide core layer. The waveguide core layer may be of GaAs, and the second light confinement layer $Ga_xAl_{1-x}As$. The grooving is arranged to partition individual waveguide Schottky contacts, each of which is connected to respective biasing means.

The diode structure may alternatively be a PIN arrangement. In this case the waveguide core layer is an I region between two semiconductor light confinement layers of mutually opposite conductivity type and lower refractive index. One of the light confinement layers may be common to each of the waveguides. The structure may comprise a substantially undoped GaAs waveguide core layer between $Ga_xAl_{1-x}As$ light confinement or waveguide cladding layers.

In one embodiment, the waveguide core layer is of material which is electro-refractive (as opposed to electro-absorbing) at the operating optical wavelength. In this embodiment, the invention acts as an electrically controlled phased array from which the output beam direction is steered by variation in waveguide array voltages.

The invention may be a discrete device arranged to output light from the waveguides into a dissimilar medium such as air. In this case the waveguides preferably have light output surfaces in a common cleavage plane of the waveguide core layer. Materials such as lithium niobate do not have cleavage planes of this kind, and require cutting and polishing to extreme accuracy to achieve an optical quality output surface having less than cleavage plane perfection.

The waveguide array may be formed on a first region of a semiconductor material wafer having a second region in which the array light output appears. The second region may incorporate individual receive waveguides each having a respective input disposed to receive and dimensionally matched to a principal diffraction maximum produced by the waveguide array at a respective beam steer angle.

Two or more devices of the invention may be arranged in combination to provide two-dimensional optical beam steering. An individual device of the invention may be associated with a waveguide voltage source arranged to impose a phase shift on the waveguide array output beam which varies nonlinearly across the array. This produces a curved wavefront, which may converge to one or more foci if required, or which may be employed in optical aberration compensation.

The invention may be arranged to provide an electro-optic analogue to digital converter (ADC). In this case the invention incorporates m waveguides with respective bias electrodes connected to a common input and having respective lengths nL, where L is the shortest electrode length and n=1 to m. The array output beam is formed on any one of an array of detectors, and its deflection along the array is in accordance with the magnitude of an analogue signal at the common input. The beam-receiving detector location corresponds to the required digital output. The waveguides may have respective calibration electrodes to which voltages are applied to form an array output beam on a prearranged detector of the array at zero input analogue voltage. The detector array may be two-dimensional and coded to provide a direct digital output.

The waveguide core layer may be of material which is electro-absorbing at the light source wavelength. In this case, the invention may provide a digital to analogue converter, a pulse analyzer or a time-integrating correlator. The digital to analogue converter may comprise a waveguide array in which individual waveguides provide respective output intensities varying in a binary doubling scheme. The waveguides have respective electrodes and electrode addressing voltages, the latter being either of two values corresponding to binary digits and arranged to provide for the waveguides to be absorbing or transmitting. Waveguide output signals are detected and added by detecting means providing an analogue output corresponding to the digital addressing voltages of the waveguide electrodes. The pulse analyzer embodiment comprises an inductor chain connected across waveguide electrodes and providing a radio frequency (RF) delay line. The output from a pulsed laser is divided between the waveguides, whose outputs are detected by respective detectors. An RF signal is applied to the delay line and is distributed over its length. Laser pulse components in individual waveguides undergo attenuation in accordance with the respective RF signal levels, and the RF signal profile on the delay line is therefore sampled at the detector array. The time integrating correlator is of similar construction to the pulse analyzer, except that the laser is substantially continuous device modulated by a reference signal. Correlation between the reference and the delay line signals produces a peak signal at a detector associated with a waveguide experiencing synchronous electrical and optical signals.

The waveguide array may be biasable by biasing means comprising a respective bond pad and conductor connected to each waveguide. The bond pads may be arranged around a region of the device containing the waveguides and the conductors may extend over a light input region of the device.

BRIEF DESCRIPTION OF THE DRAWINGS

In order that the invention might be more fully understood, embodiments thereof will now be described, by way of example only, with reference to the accompanying drawings, in which:

FIG. 22 to 24 collectively illustrate use of the invention for analogue to digital conversion;

FIG. 25 illustrates use of the invention for digital to analogue conversion;

FIG. 26 schematically illustrates a pulse analyzer embodiment of the invention.

DETAILED DISCUSSION OF PREFERRED EMBODIMENTS

Figure 1:
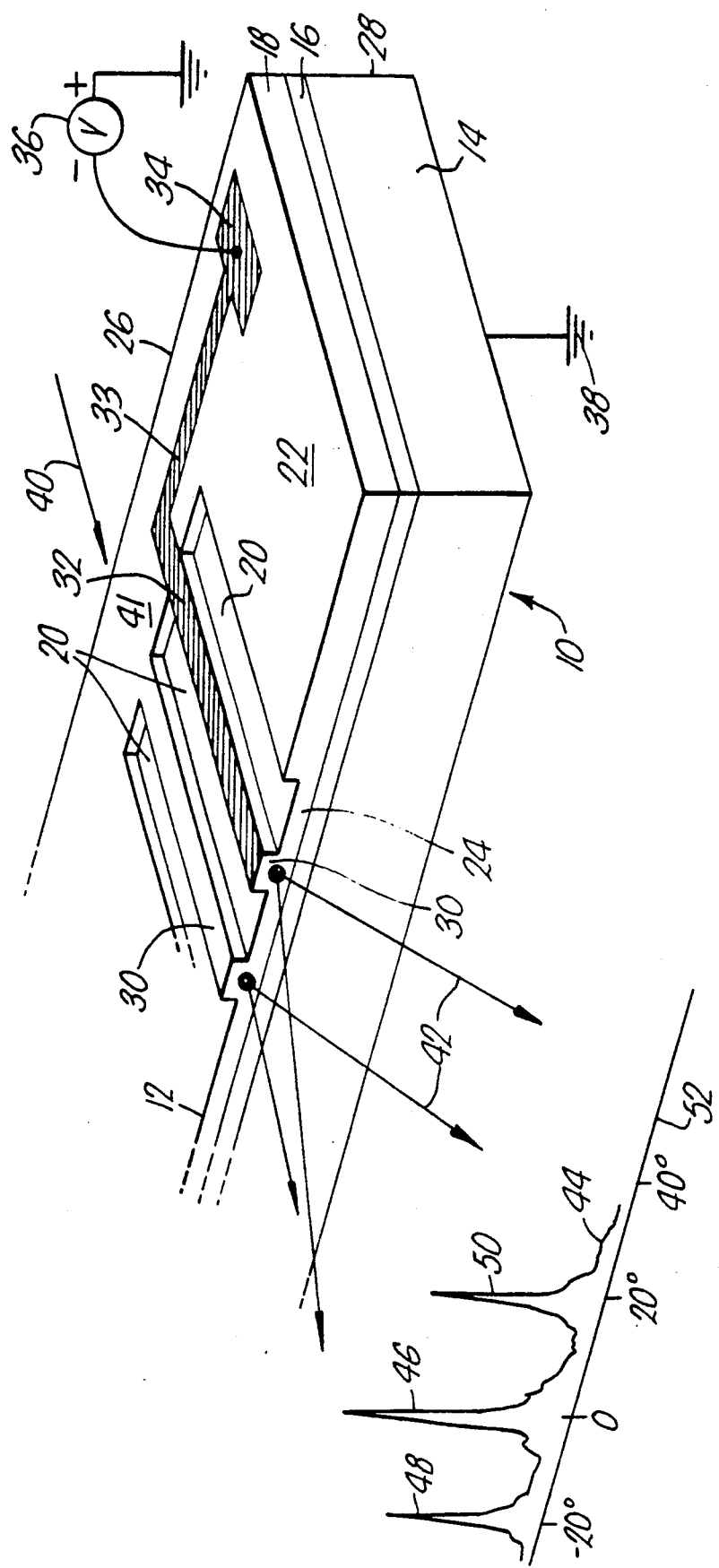
FIG. 1 is a schematic perspective view of part of an electro-optic waveguide device of the invention.

Referring to FIG. 1, there is shown a schematic perspective view (not to scale) of part of an electro-optic waveguide device 10 of the invention. Dotted lines such as 12 indicate adjacent regions of the device 10. The device 10 comprises an n+ (heavily doped n-type) GaAs substrate 14, this having an Si dopant concentration of $1 \times 10^{18}$ cm$^{-3}$. The substrate 14 is overlaid by a 1.2 μm thick waveguide cladding layer 16 of n+ Ga$_{0.9}$Al$_{0.1}$As with like dopant species and concentration.

The cladding layer 16 is surmounted by a waveguide core layer 18 which is also 1.2 μm in thickness. The layer 18 is composed of n− (undoped, residual n-type) GaAs with an Si dopant concentration of $1 \times 10^{15}$ cm$^{-3}$. The layers 14, 16 and 18 may be considered as being all of the Ga$_x$Al$_{1-x}$As system, where x=1 for layers 14 and 18 and x=0.9 for layer 16. The layer 18 has grooves 20 extending into its upper surface 22, the grooves being 1.8 mm long, 1 μm deep and 2 μm wide. The grooves 20 extend from a front face 24 of the device 10 most but not all of the way to a parallel rear face (not shown) having horizontal and vertical edges 26 and 28. The grooves 20 terminate at a distance of 400 μm from the rear edge 26. Rib waveguides 30 are defined between the grooves 20, the waveguides being 1 μm in width and 1.8 mm in length.

The upper surface of each waveguide 30 is coated with a layer of aluminum 32 extending at 33 to an electrode bond pad 34, one layer 32 and pad 34 being illustrated. The device 10 has a total of ten waveguides 30 defined by eleven grooves 20, of which two waveguides and three grooves are shown in FIG. 1. Each of the waveguides 30 has a respective aluminum layer 32 and bond pad 34, and each is connected to a respective DC bias voltage source of which one is illustrated at 36. The substrate 14 is connected to an earth 38.

The front face 24 and rear face 26/28 of the device 10 are carefully cleaved to provide optical quality surfaces. The waveguide core layer 18 consequently has edge regions in the front and rear faces which are cleavage planes of crystalline GaAs (this is not possible with materials such as lithium niobate). The rear face is illuminated with 1.06 μm wavelength light indicated by an arrow 40 from an Nd:YAG laser (not shown). The light 40 is focused to a 1 μm diameter spot (not shown) on the waveguide layer 18 region of the rear face 26/28, which is 400 μm from waveguide input ends. Light then diverges from the spot to the waveguides 30. Divergence of the light occurs in a region 41 between the device rear face 28/28 and the waveguides 30, the region 41 forming a slab waveguide and providing a common input means for the waveguides. Light beams emerging form the waveguides 30 are indicated by divergent arrows such as 42. The beams 42 combine to form a common far field diffraction pattern 44 at a minimum distance of 100 μm in free space from the device 10. The pattern 44 has a central intensity maximum 46 and two subsidiary maxima 48 and 50. An angular scale 52 ranging from −20° to +40° indicates the separation of the maxima 46 to 50 at a distance of 500 μm from the device face 24.

The mode of operation of the device 10 is as follows. Each waveguide 30 is of n− GaAs having a refractive index n of 3.46 at a wavelength of 1.06 μm. It is bounded by air (n=1) on two (groove) sides, aluminium (n<1) on a third (upper) side, and by n+ GaAlAs (n=3.40) on the fourth (lower) side. Each waveguide 30 is accordingly bounded on all four sides by media of lower refractive index, and light travelling within it is confined to varying degrees by total internal reflection. In some embodiments of the invention, it may be convenient to fill the grooves 20 with polymer or oxide material. If so, the groove material should have a refractive index which is at least 1.5 less than that of the waveguide core layer 18 to inhibit optical coupling between waveguides 30. Optical isolation of the waveguides 30 is maximized by air-filled grooves 20.

Light in each waveguide 30 is confined in the horizontal direction by air at the groove side walls, and in the vertical direction by the aluminum electrode 32 and the GaAlAs layer 16. Because of the approximately rectangular cross section of each waveguide, a mode field strength E(x,y) may be defined as the product of a horizontal component $E_h(x)$ (a function of x alone) and a vertical component $E_v(y)$ (a function of y alone). (To simplify this mode description, the vector nature of the electric field is neglected and E(x,y), $E_h(x)$ and $E_v(y)$ are assumed to be scalar functions.) The horizontal component $E_h(x)$ of a given waveguide mode may be considered as a "horizontal mode" and the vertical component $E_v(y)$ as the corresponding "vertical mode". This simplifies the description of waveguide modes by converting a two-dimensional function into a product of two one-dimensional functions. If such a mode (horizontal or vertical) tends exponentially to zero far from a waveguide associated therewith, ie at $+\infty$ or $-\infty$, the mode is said to be confined. If the mode does not tend to zero from the relevant waveguide, but instead continues as a sinusoidal wave (to $+\infty$ or $-\infty$), it is not confined and can propagate or "leak" away from the waveguide.

Each waveguide 30 may in principle support horizontal and vertical modes of light propagation, ie modes as defined above respectively perpendicular and parallel to the thickness dimension of the waveguide core layer 18. Of these modes, the lowest order vertical mode is evanescent; ie it decays exponentially and tends to zero in the aluminum and in the GaAlAs layer and is therefore confined within the waveguide. It experiences a degree of attenuation in the aluminum layer 32, but is otherwise substantially unaffected by propagation along the waveguide. This attenuation is avoided in an embodiment of the invention described later.

Light intensity which is not confined in the lowest order vertical mode in each waveguide 30 will be evanescent in the aluminum and may be either evanescent or propagating in the GaAlAs layer 16. However the thickness of the GaAlAs layer 16 should be such that a mode which is not confined in the lowest order vertical mode can leak or propagate through this layer into the substrate. Accordingly, the waveguides transmit substantially only the lowest order vertical mode.

In contrast to the vertical mode aspect, the waveguides 30 are not necessarily restricted to transmission of the lowest order horizontal mode. Single horizontal mode operation is in practice difficult to achieve, since it conflicts with the requirement to avoid optical crosstalk between adjacent waveguides. It is however important to produce output from the waveguides 30 restricted largely to a single lowest order spatial mode in both the horizontal and vertical dimensions. This is necessary to avoid overlapping diffraction patterns arising from different modes.

To avoid appreciable light intensity being output from the waveguides 30 in unwanted higher order horizontal modes, light is coupled to them in such a way that these modes receive negligible input contributions. This is achieved as follows. Light 40 incident on the rear face 26/28 of the device 10 is received from a microscope objective (not shown) of comparatively high numerical aperture. The light 40 is in the form of a cone of half angle $\approx 45°$ with its "apex" a light spot 1 $\mu$m in diameter on the surface 26/28. It is refracted at this air-semiconductor interface 26/28 to produce a cone of half-angle $\approx 12°$ in the common input region 41. This second cone is greater in horizontal extent than that required to illuminate the waveguides 30, which collectively subtend an angle of about 4° (half angle 2°) at the input face 26/28. The waveguides 30 are located in the central region of this second cone, where light intensity is approximately uniform. Each waveguide 30 accordingly receives input light intensity at angles less than 3° inclination to its central axis of propagation.

Analysis of the horizontal modes of the waveguides 30 indicate that virtually no intensity is available to the second and higher order modes for light input at angles less than 3° to waveguide axes. The input light consequently excites substantially only the lowest order spatial mode in the horizontal plane. In subsequent propagation down a waveguide 30, imperfections in the waveguide material and its boundaries may produce a small amount of diversion of energy to second and higher order horizontal modes. This would not occur in an ideal waveguide.

To summarize, and ignoring imperfections, the waveguides 30 produce light output intensity substantially confined to the lowest order horizontal and vertical modes. Output of higher order vertical modes is inhibited by the spatial filtering action of the buffer layer 16, and output of higher order horizontal modes is inhibited by the light input arrangements. The result is that the waveguides 30 in combination produce a far field diffraction pattern 44 arising substantially form lowest order spatial modes. Diffraction patterns resulting form higher order waveguide spatial modes do not appear with an y significant intensity, which avoids the uncertainty which their overlap with the pattern 44 would produce. A device in accordance with FIG. 1 has proved to produce more than 95% of its output intensity in the lowest order modes.

As will be described later in more detail, the refractive index and optical path length in each waveguide 30 are electric field dependent since the waveguide core layer material has electro-optic (ie electro-refractive) properties. Variation of the voltage on the aluminum layer 32 of any waveguide consequently alters the phase of its light output. The far field diffraction pattern 44 is a vector sum of phase and amplitude contributions from the waveguides, and the position of the principal maximum 46 is variable by varying the waveguide voltages. However, in this connection it is important to avoid overlapping diffraction patterns as previously discussed, since different waveguide modes and their diffraction patterns are affected differently by waveguide voltage variation. If overlapping diffraction orders are not avoided, steering of the lowest order becomes adulterated by contributions from higher orders.

The optical path length L in each waveguide 30 is given by $$L = nd \quad (1)$$

where n = refractive index of waveguide layer 18 and d = length of waveguide.

However, n is electric field dependent, and may be expressed by $$n = n_o + n_E \quad (2)$$

where $n_o$ is the refractive index in the absence of applied electric field and $n_E$ is the change in refractive index produced by an applied electric field E. As will be described later in more detail, $n_E$ has two components; one component varies directly with electric field (Pockels effect), and the other varies with the square of the field (Kerr effect). These components may be of the same or differing sign. In the present example they are additive. This is achieved by a combination of two arrangements. Firstly, the waveguide layer 18 is disposed with its [01$\bar{1}$] crystal axis in the light propagation direction along the length of each waveguide 30. Secondly, light in each waveguide is polarized parallel to the [011] crystal axis of (perpendicular to the plane of) the layer 18.

The optical path length in each waveguide 30 is varied by varying the voltage applied to the respective aluminum layer 32. The aluminum layers 32 form Schottky barrier contact to the waveguides 30, and each metal/semiconductor combination 32/30 is a Schottky barrier diode. Each aluminum layer 32 is biased negative with respect to earth by the relevant voltage source 36 in each case. This reverse biases the respective Schottky barrier diode, which enhances the diode depletion region and increases the electric field in each waveguide. This alters the waveguide refractive index and optical path length.

In order to achieve full control of the optical phase at the output of each waveguide, it is necessary to be able to change the output phase by 360° or $2\pi$ in response to voltage applied to aluminum layers 32. Specific applications of optical phased arrays of the invention may of course be realized by less than full or $2\pi$ phase control. A change of $2\pi$ in the output phase corresponds to a change of one wavelength in the optical waveguide length; ie the number of wavelengths within a waveguide 30 is required to change from some (not necessarily integer) value m to m+1 in response to a change in refractive index n from $n_o$ to $n_o+n_E$, using parameters defined in Equations (1) and (2)

ie $\quad m = n_o d/\lambda \quad$ (3)

and $\quad m+1 = (n_o+n_E) d/\lambda \quad$ (4)

where $\lambda$ is the free space optical wavelength.

Subtracting (3) from (4) gives $\quad 1 = n_E d/\lambda \quad$ (5)

ie $$d = \frac{\lambda}{n_E}$$

In the present example, with the [01$\bar{1}$] and [011] propagation and polarization directions respectively in the waveguide layer 18, a change $n_E$ in refractive index of $5.9 \times 10^{-4}$ at 1.06 μm wavelength resulted form a change in voltage from zero to 21 V applied to the aluminum layers 32. Substituting for $\lambda$ and $n_E$ in (5) provides $$d = \frac{1.06 \times 10^{-4}}{5.9 \times 10^{-4}} = 1.8 \text{ mm}$$

A waveguide length of 1.8 mm accordingly provides for tuning of waveguide output phase through a complete phase cycle of $2\pi$ or 360° for a bias voltage change from 0 to 21 V (less than 30 V) in the embodiment of FIG. 1. Such tuning is necessary to obtain complete control of waveguide output phase, although some applications of the device 10 may not require such control.

It can be shown that the change $n_E$ refractive index is given by $\quad n_E = \frac{1}{2}\Gamma n_o^3 [\pm r_{41}E - R_{12}E^2] \quad$ (6)

where $\Gamma$ = waveguide confinement factor expressing proportion of guided light intensity within waveguide layer 18

$E$ = electric field in waveguide $r_{41}$ = linear electro-optic coefficient (Pockels effect)

$R_{12}$ = quadratic electro-optic coefficient

For the $n^-$ GaAs material of the waveguide layer 18, $r_{41}$ and $R_{12}$ are both negative. In addition, the $\pm$ sign preceding $r_{41}$ in Equation (6) is replaced by a negative sign for propagation in the [01$\bar{1}$] crystal direction and polarization along the [011] direction, as in the FIG. 1 embodiment. This renders the terms in parenthesis in Equation (6) additive and $n_E$ positive, which maximizes $n_E$.

A second embodiment of the invention was manufactured for comparison purposes. This differed from that previously described only in that the waveguide layer crystal orientation corresponded to exchange of the propagation and orientation directions of the earlier example; ie propagation was along the [011] crystal direction and polarization was parallel to the [01$\bar{1}$] direction. In this case, the $r_{41}$ term in Equation (6) is preceded by a + sign and the terms in parenthesis subtract. This produces a lower value of $n_E$ which is negative, since the $r_{41}$ term is greater than the $R_{12}$ term. Refractive index accordingly reduces with increasing electric field and has a lower magnitude at non-zero field than in the earlier example.

Figure 2:
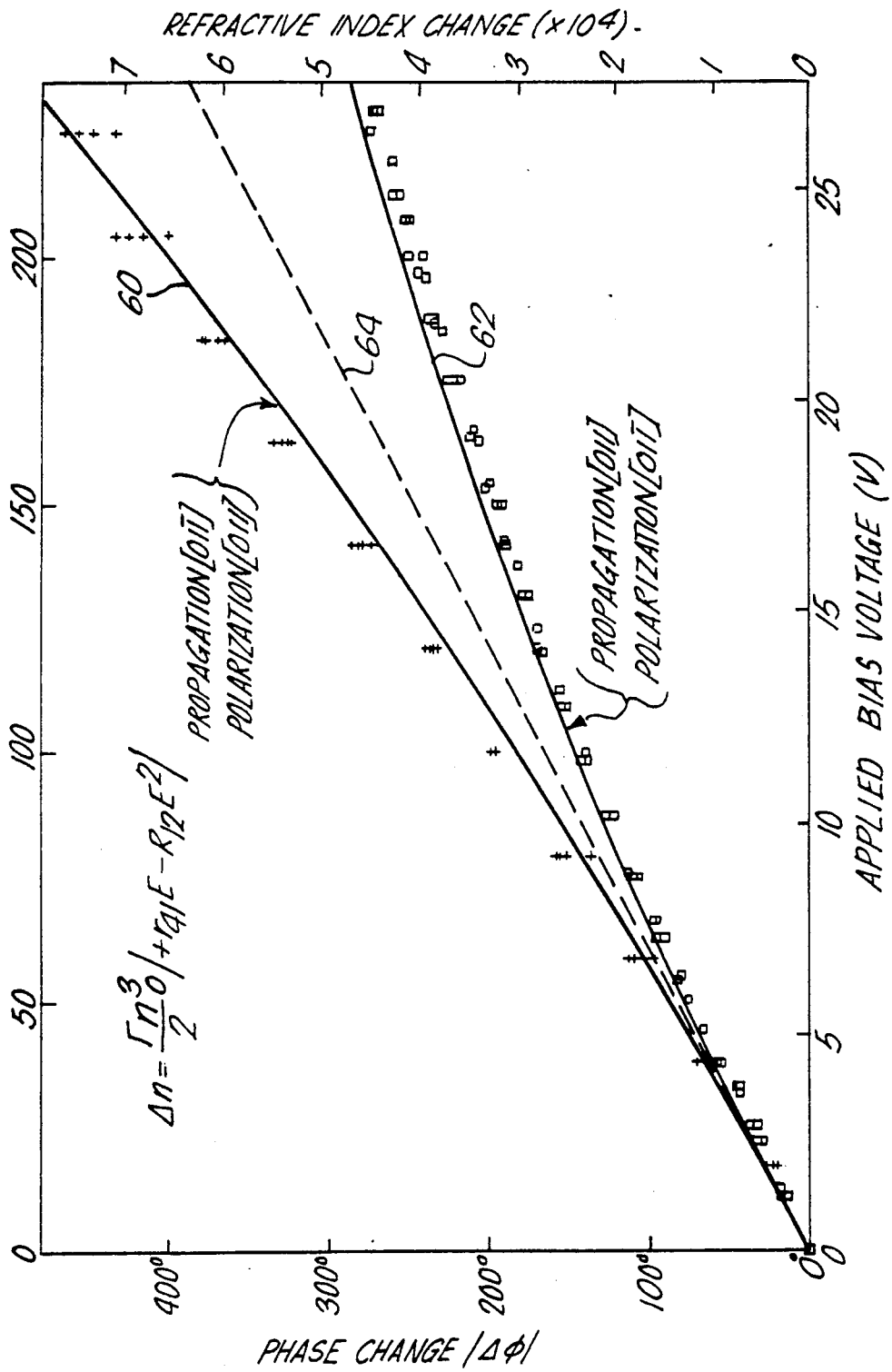
FIG. 2 is a graph illustrating electro-optic properties of the waveguide material in the FIG. 1 device.

Referring now to FIG. 2, modulus of waveguide output phase change $|\Delta\Phi|$ (left hand ordinate axis) is plotted as a function of voltage (lower abscissa axis) for both the foregoing examples of the invention. The solid graphs 60 and 62 are theoretically calculated best fits to experimental data indicated by crosses and squares respectively. A chain line 64 indicates the Pockels effect linear term $r_{41}E$ in Equation (6), whereas curvature of the graphs 60 and 62 illustrates the effect of the quadratic term $R_{12}E^2$.

As indicated by the expression in the upper left FIG. 2, the modulus of $n_E$ is represented in the graphs 60 to 64 for ease of illustration. Strictly speaking, graphs 60 and 62 should be plotted against positive and negative ordinate axes respectively. Moreover, graph 64 should be positive or negative depending on whether it is compared to graph 60 or 62. However, for the purposes of this specification only absolute magnitudes are important.

Graph 60 corresponds to the first example of the invention previously described, in which light propagation is in the [01$\bar{1}$] crystal direction in each waveguide 30.

Graph 62 corresponds to the second example of propagation in the [011] direction. It is seen that graph 60 indicates greater waveguide output phase change than graph 62 at any particular waveguide bias voltage, and the difference between the graphs increases with increasing voltage. Accordingly, the graph 60 propagation direction [01$\bar{1}$] (polarization [011]) is preferred for GaAs waveguides, since this maximizes the phase change for a given applied voltage. It also minimizes the length of waveguide necessary to achieve a given phase change with a given applied voltage. This both makes the device 10 easier to manufacture and reduces waveguide capacitance. These propagation and polarization directions with respect to crystal axes are also optimum for all zinc blende crystal structures, ie most of the group II-VI and III-V compound semiconductors.

FIG. 2 also shows an upper ordinate axis calibrated in terms of electric field in the waveguides 30, and a right hand ordinate axis indicating refractive index change $n_E$ with voltage or field. It can be seen that $n_E = 5.9 \times 10^{-4}$ corresponds to an applied bias voltage of 21 volts, which was described earlier as a convenient design criterion for waveguide length (1.8 mm).

Figure 3:
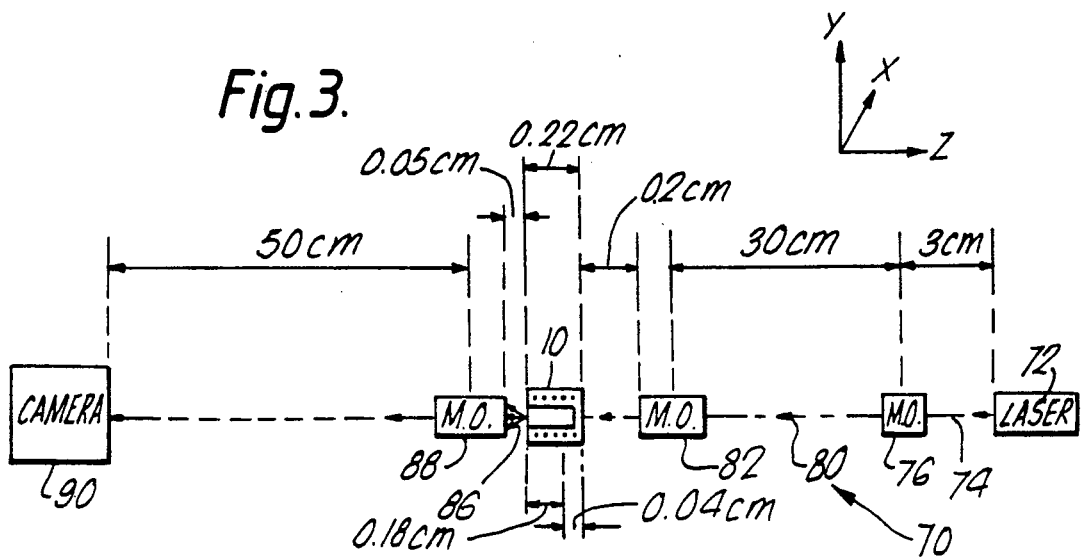
FIG. 3 is a schematic block diagram of an optical system employed to evaluate the FIG. 1 device.

Referring now to FIG. 3, there is schematically illustrated a block diagram of an optical system 70 arranged to demonstrate beam steering with a device 10 of the invention. The system 70 is not drawn to scale, since some dimensions are of the order of tens of centimeters and others hundreds of microns. Apparatus dimensions are indicated in the upper part of the drawing. Parts previously described are like-referenced.

The system 70 comprises a C95 model Nd-YAG laser 72 manufactured by CVI Inc., an American corporation. The laser 70 produces a 0.5 Watt output beam 74 2 mm in diameter with a wavelength of 1.06 μm. The beam 74 passes to a first microscopic objective (MO) 76 having a numerical aperture of 0.15 and 5× magnification, which expands the beam diameter to 5 mm at a distance of 30 cm (measured between $1/e^2$ intensity points). The MO 76 is 0.5 cm in length and distant 3 cm from the laser 72. Light 80 from the first MO 76 passes to a second MO 82 30 cm distant. The second MO 82 has 20× magnification and a numerical aperture of 0.54, and is spaced by 2 mm from the beam steering device 10. It focuses the laser light to a 1 μm diameter spot 84 on the rear or input surface of the device 10. Light emerging at 86 from the device 10 is collected by a third MO 88 distant approximately 0.05 cm (500 μm) and having optical parameters equal to those of the second MO 82. The third MO 88 collimates light from the device 10, rejecting stray light which has not passed through the waveguides 30. It relays the light to an infrared camera 90 50 cm distant. The camera incorporates a charge coupled device (CCD) array, and is manufactured by Hamamatsu Photonics K K, a Japanese company.

Conventional procedures are adopted to align the elements of the system 70. All three MOs 76, 82 and 88 are mounted on adjustable supports movable in the X and Y directions. Moreover, MOs 82 and 88 are movable in the Z direction. As indicated at 92 in the drawing, the X direction is perpendicular to the plane of the drawing, the Z direction is parallel to the system optical axis or light beam direction, and the Y direction is in the plane of the drawing.

The position of the first MO 76 is adjusted to produce an undeviated beam expanded 2½ times. The second MO 82 is adjusted to produce an undeviated focused spot on the device 10, the spot being substantially diffraction limited. The third MO 88 is then adjusted to exclude stray light, but to collect light from the far field diffraction pattern produced by the waveguides 30. The far field corresponds to distances greater than 100 μm from the device 10. The separation between the light input surface of MO 88 and the device 10 is 500 μm (0.05 cm), which provides adequate rejection of stray light and collection of light transmitted by the waveguides 30. If the dimensions of the camera 90 allowed its positioning closer to the device 10, the third MO would be unnecessary to record the whole diffraction pattern.

FIG. 3 illustrates the waveguides of the device 10 being illuminated from a common light source 70. This will be a typical arrangement. The laser may alternatively be integrated on the same semiconductor wafer as the device 10. Light may then be distributed to individual waveguides by a branched manifold waveguide arrangement. However, the waveguides may be illuminated from differing sources, so long as such sources are phase coherent with one another.

Figure 4:
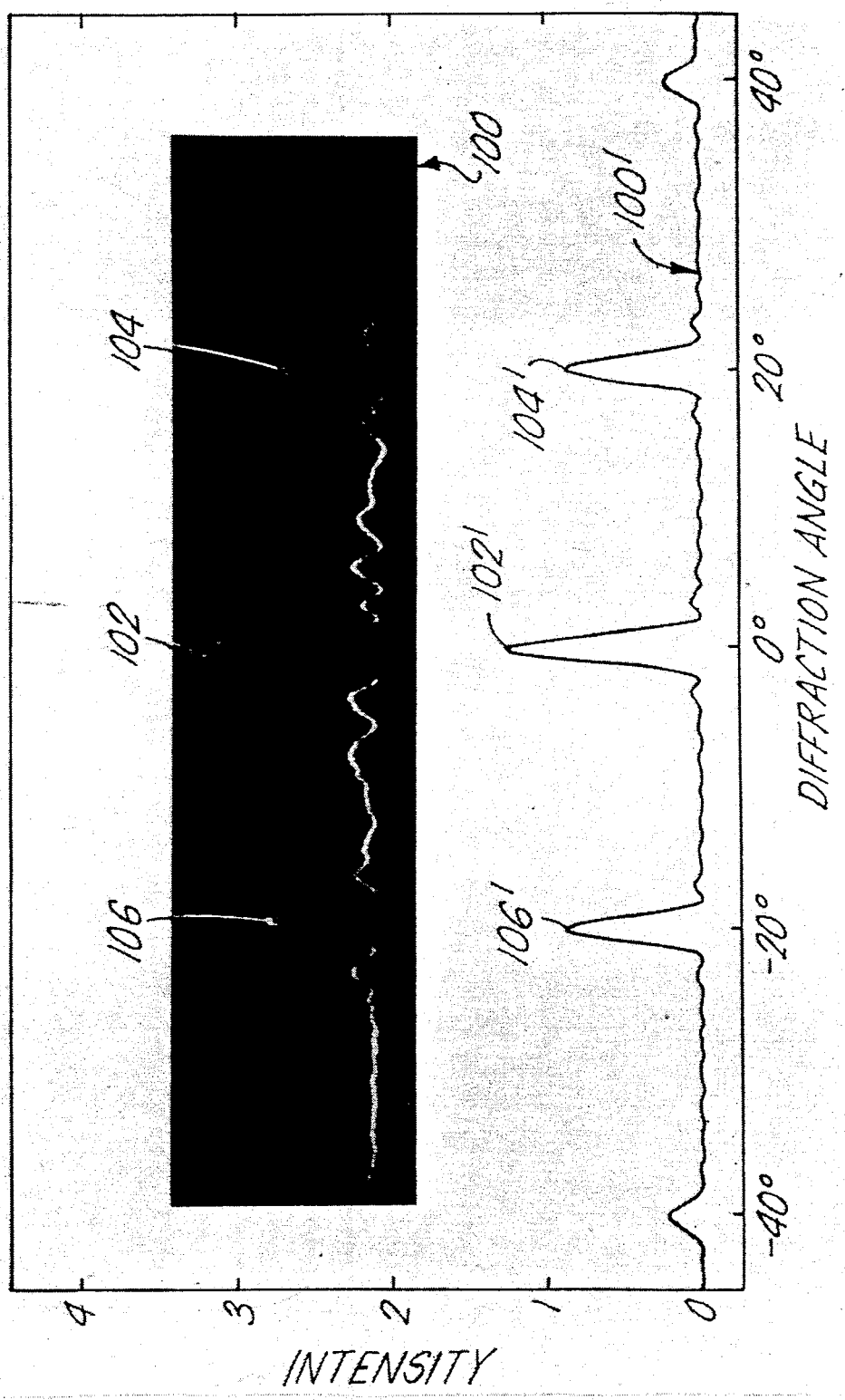
FIGS. 4 and 5 provide graphs of light intensity against angle illustrating optical beam steering.
Figure 5:
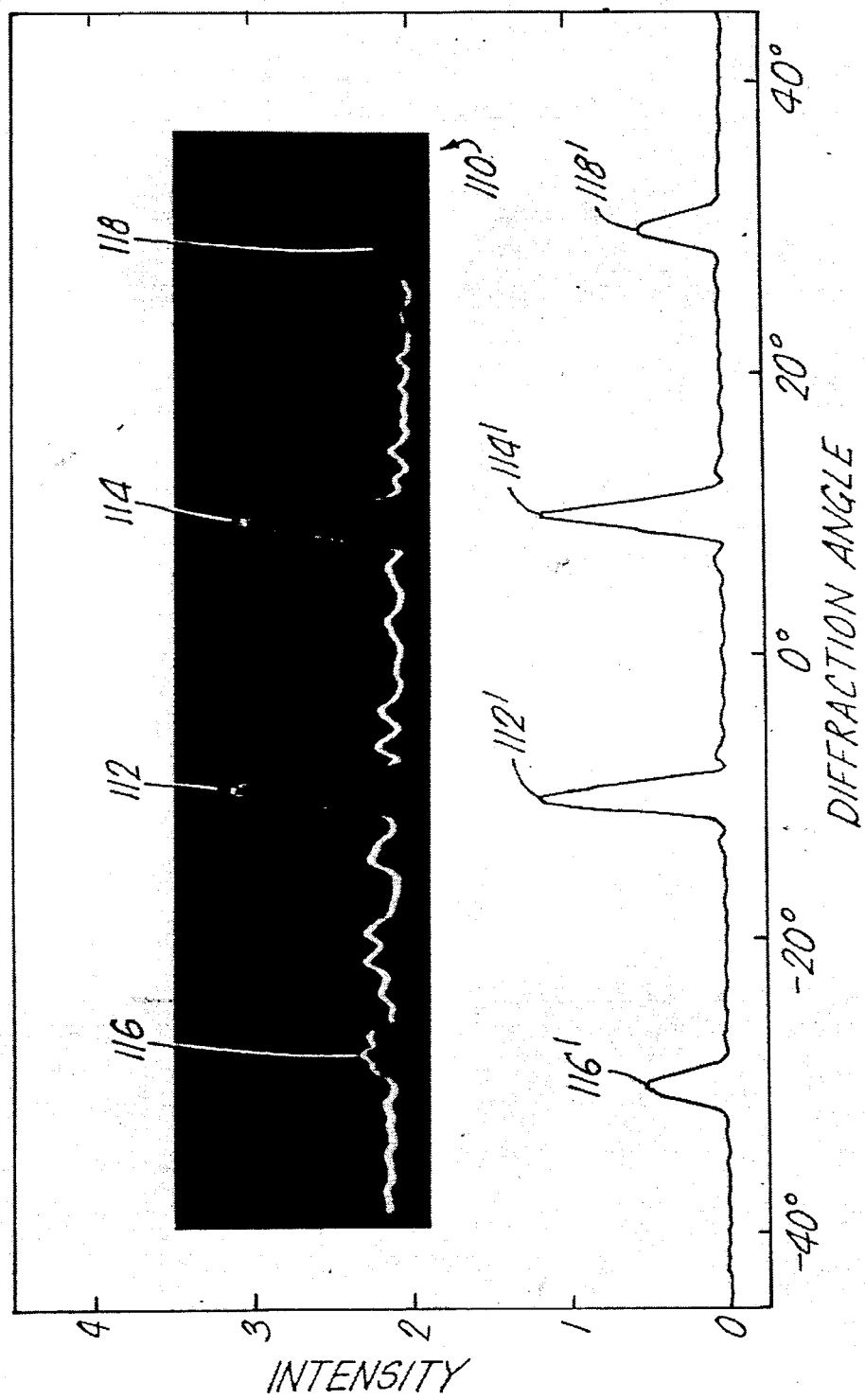

Referring now to FIGS. 4 and 5, there are shown graphs of light intensity (arbitrary units) against diffraction angle in degrees. In each of the figures, the upper drawing is experimentally determined using the system 70 of FIG. 3, and the lower drawing is a theoretically calculated equivalent.

In FIG. 4, the upper graph 100 shows the angular dependence of output intensity from the device 10 for voltages on the waveguides 30 producing waveguide optical output all substantially in phase with one another. This provided a principal maximum 102 at 0°, ie parallel to the waveguide length dimensions or perpendicular to the output form face 24 of the device 10. In this connection, the waveguides 30 are nominally all the same length. It is however impossible to achieve length equality accurate to a small fraction of a wavelength, as would be required for outputs from the waveguides 30 to be in phase with one another with equal voltages applied to all electrode bond pads 34. In practice therefore, the voltages on the pads 34 were adjusted relative to one another to produce the maximum 102 at 0°.

The principal maximum 102 has a beamwidth (full width at half height) of 1.5°. It is accompanied by high order diffraction maxima 104 and 106 at angular separations or diffraction angles of nearly +20° and −20° respectively.

Features in the lower graph 100′ equivalent to those in the upper graph 100 are like-referenced with a prime superscript. It can be seen that there is good agreement between the positions of maxima 102 to 106 with maxima 102′ to 106′.

Turning now to FIG. 5, there are shown experimental and theoretical graphs 110 and 110′, and as before features of graph 110′ equivalent to those in graph 110 are like referenced with a prime superscript. Two principal maxima 112 and 114 appear in graph 110, these being at diffraction angles of approximately −10° and +10° respectively. Two high order diffraction maxima 116 and 118 also appear just resolved at approximately −30° and +30°. The graph 110 was obtained using waveguide voltages which provided for each waveguide optical output to be in antiphase with those neighboring; ie the nth waveguide optical output had a phase $(n-1)\pi + \phi$, where $\phi$ is a constant.

The waveguide voltages employed to produce the graphs 100 and 110 are shown in Table 1 for one specific embodiment of the device 10. It is emphasized that these voltages would not in general be appropriate for other devices of the invention, since manufacturing tolerances produce waveguide length variation.

TABLE 1

| WAVE-GUIDE NUMBER | WAVEGUIDE VOLTAGE (VOLTS) | |
|---|---|---|
| | GRAPH 100 (FIG. 4) IN PHASE WAVEGUIDE O/PS | GRAPH 110 (FIG. 5) ALTERNATING PHASE WAVEGUIDE O/PS |
| 1 | 1.5 | 6.8 |
| 2 | 3.4 | 5.9 |
| 3 | 4.6 | 9.9 |
| 4 | 7.4 | 9.1 |
| 5 | 20.9 | 3.2 |
| 6 | 18.9 | 13.5 |
| 7 | 7.2 | 0.8 |
| 8 | 6.5 | 21.3 |
| 9 | 23.6 | 16.5 |
| 10 | 18.9 | 2.5 |

FIGS. 4 and 5 demonstrate that the device 10 is capable of producing an output beam steerable from 0° to ±10° by changing the voltages applied to the waveguides 30. This may be employed to divide one beam into two, or alternatively to steer one beam through an angle of 10°. The device 10 may therefore be seen as an electronically controlled 1 to 2 way switch, or as a beam deflecting device. Moreover, these applications are realized with only two voltage combinations applied to the waveguides 30. Many other applications are possible with other voltage combinations, such as gradual steering through a range of angles. As evidenced by the agreement between experiment and calculation in FIGS. 4 and 5, the device 10 performs in a way which may be precalculated for engineering design purposes.

The waveguide array of the device 10 is capable of very high speed operation. Calculation of electrode/waveguide capacitance indicates a switching speed in excess of 1 GHz and in the order of 10 GHz. This is more than an order of magnitude greater than fast digital electronic circuits at the present state of the art. Limitations on the use of the invention are therefore likely to arise from the deficiencies of conventional electronics, rather than from its inherent properties. The speed of the device 10 as a whole is reduced by the capacitance of bond pads and leads 33/34. However, operating speed may be improved to approach that of the waveguide array with known dielectric isolation techniques.

FIGS. 4 and 5 demonstrate that the device 10 is capable of steering a 1.5° wide light beam through 20°. It is considered that similar devices incorporating greater numbers of narrower, more closely spaced waveguides would be capable of steering a beam less than 0.1° wide through at least 80°.

The device 10 was manufactured as follows. The substrate 14 was of commercially available GaAs single crystal material. Successive cladding and waveguide layers 16 and 18 were grown on the substrate by metal-organic chemical vapor deposition (MOCVD). This is a mature semiconductor growth technology which is well known to those skilled int he art of semiconductor materials, and will to described in detail. The waveguide layer 18 was coated with electron beam (e$^-$) resist, and the resist was exposed in an electron beam lithography (EBL) apparatus to define regions for ten bond pads 34. The exposed resist was then removed to provide a patterned resist layer for coating with Ti/Pd/Au alloy. The coated resist was dissolved in acetone to leave deposited bond pads 34 on the waveguide layer 18. This is referred to as a "lift-off" technique. A second e$^-$ resist layer was subsequently deposited on the waveguide layer 18, the resist being exposed by EBL to define waveguide electrode regions and regions for waveguide/bond pad connections. The exposed resist was removed to define resist-free regions of the waveguide layer 18. The patterned resist surface was the coated with evaporated aluminum, and the unexposed resist and its unwanted aluminum removed by soaking in acetone. This provided waveguide electrodes 32 and their connections 33 to bond pads 34. The waveguide layer was then coated with resist once more, and the resist removed from regions required to be formed with grooves 20. The substrate 14 was subsequently placed in a reactive ion etch apparatus, and the grooves 20 were produced using a $CCl_2F_2$ etchant. The aluminum electrodes 32 provided ion shielding from the waveguides 30 and the resist provided the equivalent for bond pads 34 and connections 33. Reactive ion etching is a mature technology and will not be described in detail. The waveguide output face 24 and device rear surface 26/28 were subsequently produced by scribing the device 10 with a diamond scriber and breaking it across a support edge. The waveguides themselves were not scribed to avoid damage. This procedure produced good optical quality surfaces.

Figure 6:
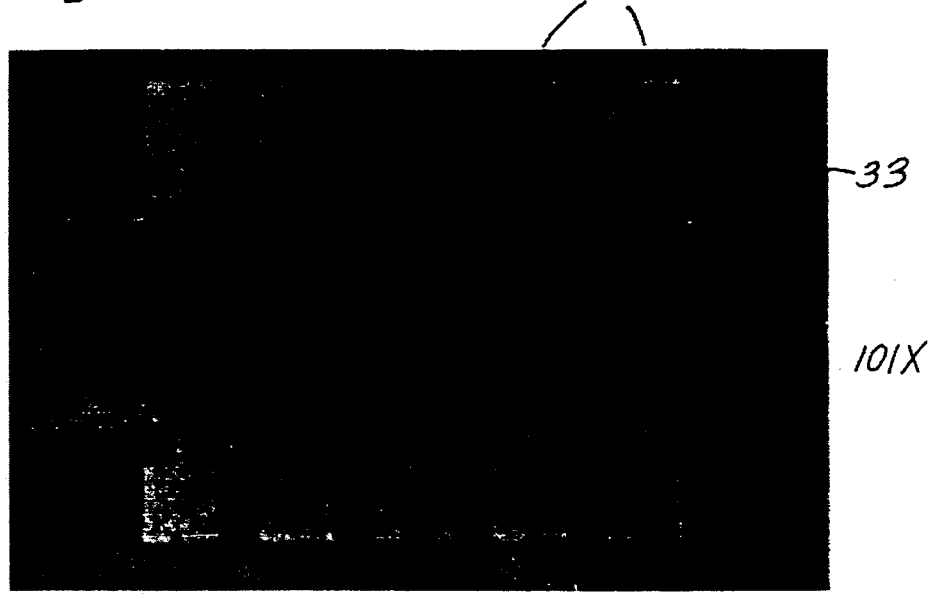
FIGS. 6 to 9 are reproductions of microphotographs showing an embodiment of the FIG. 1 device in whole or in part.
Figure 7:
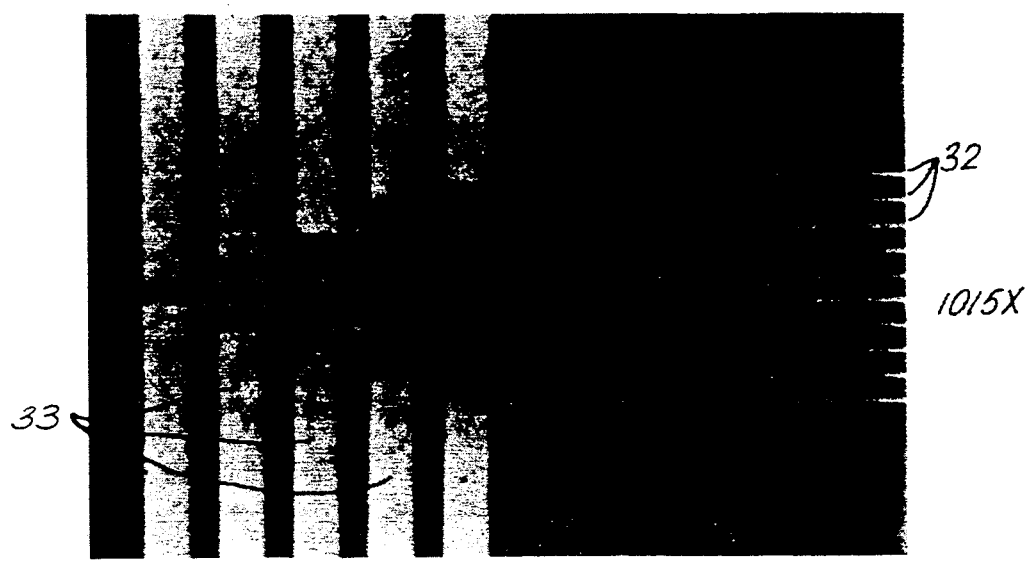
Figure 8:
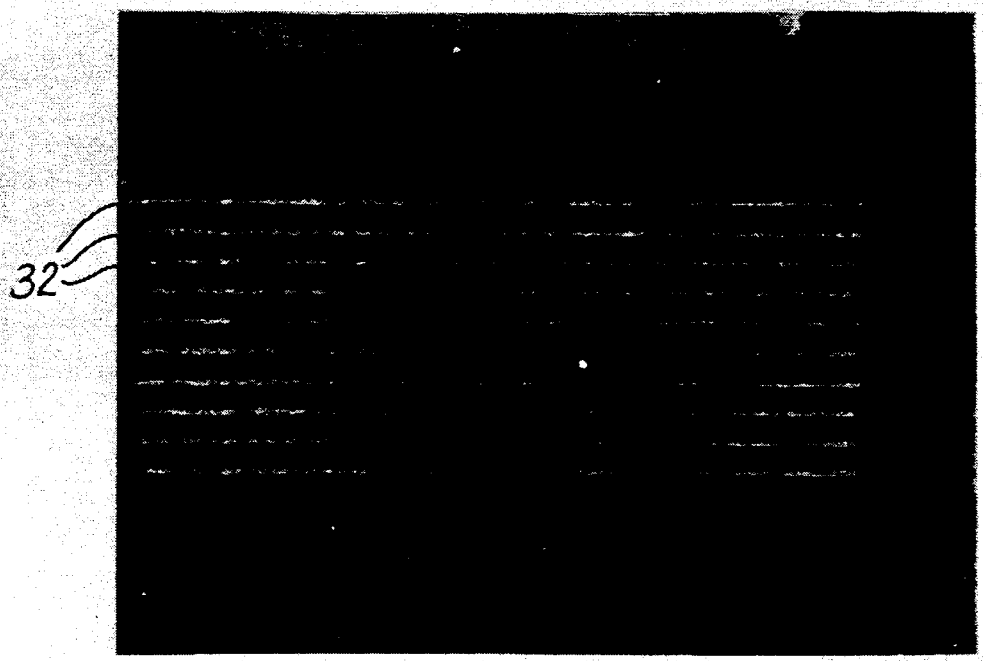

Referring now to FIGS. 6 to 9, there are shown reproductions of microphotographs of the device 10 employed to produce the results shown in FIGS. 4 and 5, and parts previously described are like reference. FIG. 6 is a plan view of the device 10 shown at 101× magnification. Bond pads 34 and their connections 33 are visible, but grooves 20 and waveguides 30 are not visible. FIG. 7 shows an interconnection region between aluminum waveguide electrodes 32 and connections 33 to bond pads 34 (not shown). FIG. 8 shows parts of the waveguide electrodes 32 absent from FIG. 7. FIGS. 7 and 8 are at 1015× magnification.

Figure 9:
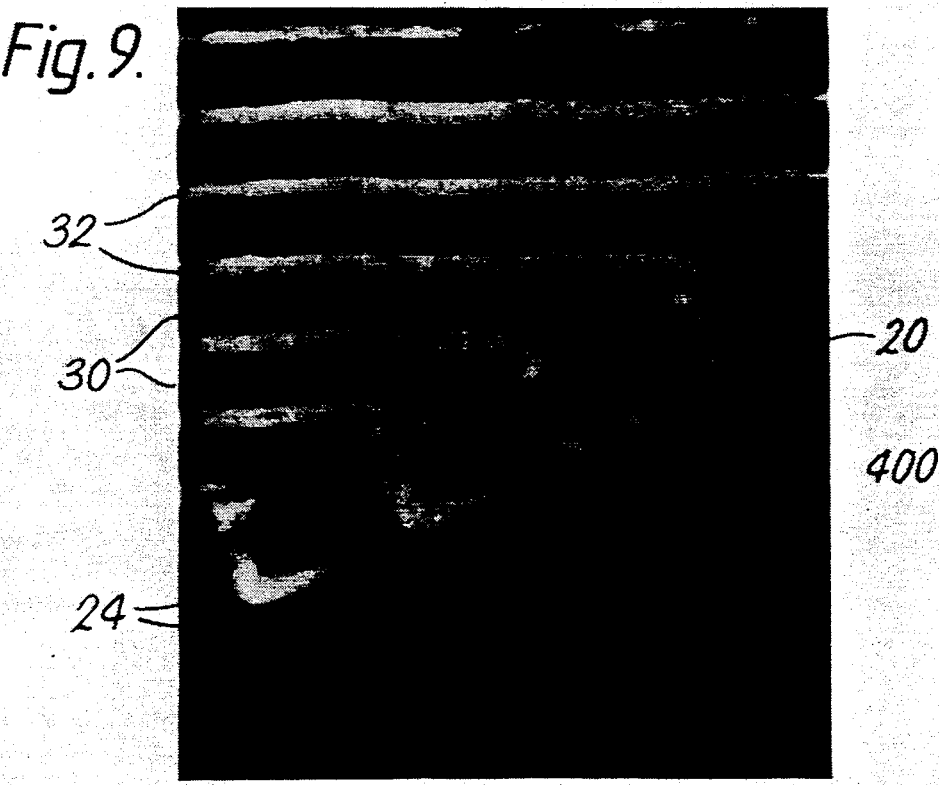

FIG. 9 is a scanning electron microscope photograph at approximately 4000+ magnification of part of the device 10 shown in perspective. The cleaved waveguide output face 24, waveguides 30, grooves 20 and aluminium waveguide electrodes 32 are clearly visible.

Use of the device 10 has been described in conjunction with light of 1.06 μm wavelength in free space, the cladding layer 16 being $Ga_{1-x}Al_xAs$ with x=0.1 (refractive index n=3.40) and the waveguide layer 18 being undoped GaAs (n=3.46). The cladding layer may alternatively be a different ternary compound of the GaAlAs system, eg X=0.3 (n=3.28).

Figure 10:
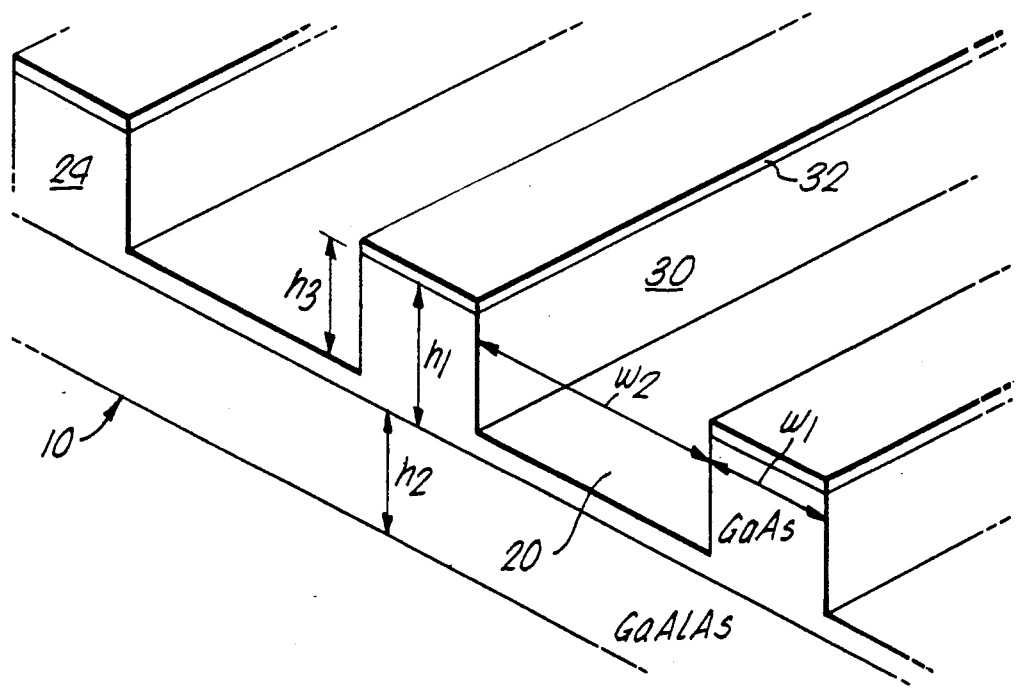
FIG. 10 is an idealized perspective drawing of an end face of the FIG. 1 device, and provides dimensional parameters.

Referring now to FIG. 10, there is shown a perspective view of part of the end face 24 of the device 10, parts previously described being like referenced. This drawing indicates device dimensions $h_1$ to $h_3$, $w_1$ and $w_2$, where:

$h_1$ = thickness of waveguide core layer 18
$h_2$ = thickness of cladding layer 16
$h_3$ = depth of groove 20 in layer 18 (ignoring thickness of aluminum 32)
$w_1$ = width of waveguides 30
$w_2$ = width of grooves 20
L = waveguide length
D = distance from device input face 26/28 to waveguide 30
P = minimum distance in air from device 10 at which a far field diffraction pattern is formed (in the absence of focussing).

Table 2 provides an indication of design data for the values of $h_1$ to P in terms of the free space wavelength λ of the light used, where λ is between 1 and 10 μm. A GaAs waveguide core layer 18 is assumed.

The design parameters given in Table 2 are indicative rather than critical. More general design considerations are described later. The value of D may be reduced if a cylindrical lens is employed to form a line input focus on the rear face 26/28 of the device 10. It will be noted that $h_1$ to $h_3$ depend on buffer layer composition, whereas $w_1$ to P do not, at least to a first approximation.

TABLE 2

| Device Parameter | Cladding layer 16 Composition $Ga_{1-x}Al_xAs$ | |
| --- | --- | --- |
| | x = 0.1 | x = 0.3 |
| $h_1$ | $0.8 \lambda \leq h_1 \leq 1.2 \lambda$ | $0.5 \lambda \leq h_1 \leq 0.8 \lambda$ |
| $h_2$ | $h_2 \geq \lambda$ | $h_2 \geq 0.8 \lambda$ |
| $h_3$ | $h_3 \geq 0.8 h_1$ | $h_3 \geq 0.8 h_1$ |
| $w_1$ | $0.4 \lambda \leq w_1 \leq 2\lambda$ | |
| $w_2$ | $w_2 \geq \lambda$ | |
| L | $L \geq 1800 \lambda$ | |
| D | $D \geq 300 \lambda$ | |
| P | $100 \lambda$ | |

The grooves 20 extend through five-sixths of the waveguide core layer 18. This is a compromise for a particular waveguide pitch and operating wavelength, since it is necessary to reconcile two conflicting requirements as follows. Increasing the etch depth in the waveguide core layer 18 increases the optical isolation or reduces optical cross-talk or coupling between adjacent waveguides. Against this, a greater etch depth increases the area of chemically etched surface of each waveguide, which increases optical scattering at such surfaces with consequent excitation of unwanted optical modes and increase in optical loss. The etch depth should therefore be the minimum necessary to achieve adequate optical isolation. The required etch depth reduces with increased waveguide separation ($w_2$), which also improves optical isolation. A specific design may be tested for spatial mode content by observing its output diffraction pattern. Moreover, by cleaving the device 10 at the waveguide inputs to remove the slab input waveguide 41, light may be focused on the input of one waveguide and output of all waveguides monitored to measure optical coupling. If there is significant output from more than one waveguide, the groove depth and/or waveguide spacing should be increased.

The values in Table 2 were produced for GaAs waveguides on GaAlAs. If other waveguide materials are employed, the design parameters will scale with refractive index and/or electro-optic coefficient as appropriate. This will not be described in detail, since such considerations are very well understood by those skilled in the art of electro-optics.

More generally, design considerations for the invention are as follows. it is desirable to reduce size as far as possible consistent with adequate performance. As the waveguide center-to-center spacing (array pitch $w_1+w_2$) is reduced, the diffraction angles of unwanted sidelobes (higher order of diffraction) increases. An array pitch of one optical wavelength produces sidelobes at $\pm 90°$ when the main lobe is at 0° (boresight). The relevant optical wavelength is that in the medium (eg air) into which the array provides light output. Steering the main beam or lobe results in one sidelobe disappearing by virtue of total internal reflection within waveguides. An array pitch of 0.5 wavelengths produces total internal reflection of all unwanted sidelobes for all main beam steer angles. Reducing the array pitch below 0.5 wavelengths does not improve array diffraction properties and increases manufacturing difficulty. The array pitch need not be constant. The diffraction properties of the array are controlled by the array pitch at the output end face 24 of the device 10. Thus the device may incorporate a waveguide array in which the pitch is reduced at the output end face. This allows waveguides to be more widely spaced remote from the end face in order to reduce optical coupling.

The maximum value of the array pitch $(w_1+w_2)$ is dictated by the minimum acceptable range of beam scan angles, since the range reduces with increasing pitch. An array pitch of 20 wavelengths provides a 3 degree range of scan angles for the device. For array pitch values below 10 wavelengths, air-filled inter-waveguide grooves 20 become highly desirable to provide the abrupt change in refractive index required to isolate the waveguides optically from their neighbors. It may be convenient for manufacturing purposes to fill the grooves 20 with a material such as $SiO_2$ or other insulant. If so the filler material should have as low a refractive index as possible, and in any case at least 1.5 lower than that of the waveguide core layer 18.

It is highly desirable to produce a beam steering device which is sufficiently small to be integrated with other components on a single semiconductor wafer in the region of 10 cm in diameter. If it is required to both generate and receive the steered beam on the wafer, the device and its far field diffraction pattern must collectively be smaller than the wafer. A device of the invention with 20 waveguides with $w_1=0.3$ $\mu$m and $(w_1+w_2)=0.6$ $\mu$m operating at 1.06 $\mu$m wavelength provides a far field diffraction pattern which is almost fully formed at a distance of 100 $\mu$m in air from the output face 24. The equivalent for a similar device with $w_1=3$ $\mu$m and $w_2=10$ $\mu$m is a distance of 6 mm. These distances should be multiplied by about 3.6 if output into a GaAs medium is envisaged. In comparison, the prior art device of GB 1592050 employs waveguides 8 $\mu$m wide with a 40 $\mu$m pitch; twenty of such waveguides would result in a far field diffraction pattern distant more than 10 cm in air at a 1.06 $\mu$m operating wavelength.

Reducing the width $w_1$ of individual waveguides produces a wider and more uniform diffraction pattern envelope, and reduces variation in main beam intensity with steer angle. The optimum value of $w_1$ of 0.5 wavelengths in the medium receiving the waveguide output, but this may be reduced further at the expense of increased losses by internal reflection within the waveguides. A reasonable minimum waveguide width if 0.3 wavelengths.

The maximum width $w_1$ of individual waveguides at any given array pitch is dictated by the requirement of at least approximate (above 90%) single mode output without significant optical coupling or cross-talk between adjacent waveguides. The waveguide width is preferably not more than one half the array pitch; ie $w_1 \leq \frac{1}{2}(w_1+w_2)$ or $w_1 \leq w_2$. A reasonable maximum value of $w_1$ for a 10 wavelength pitch array is 3 wavelengths. The diffraction envelope narrows and the main beam intensity varies more greatly with beam angle for increasing waveguide width at the output surface.

The device 10 has a capacitance of 0.1 pF per mm of waveguide length, assuming bond pads 34 are isolated and do not contribute. A waveguide 2 mm long with a 50 ohm resistance is limited to a frequency of 100 GHz. However, the wavelength of a 50 GHz signal in GaAs is about 2 mm, and the positive and negative half-cycles of the signal can nullify one another's effects. The effect of this is to reduce the 3 dB cut-off frequency to about 25 GHz. In comparison, the equivalent calculated cut-off for GB 1592050 is about 2.2 GHz or less. The invention is therefore capable of at least an order of magnitude improvement in operating frequency.

Figure 11A:
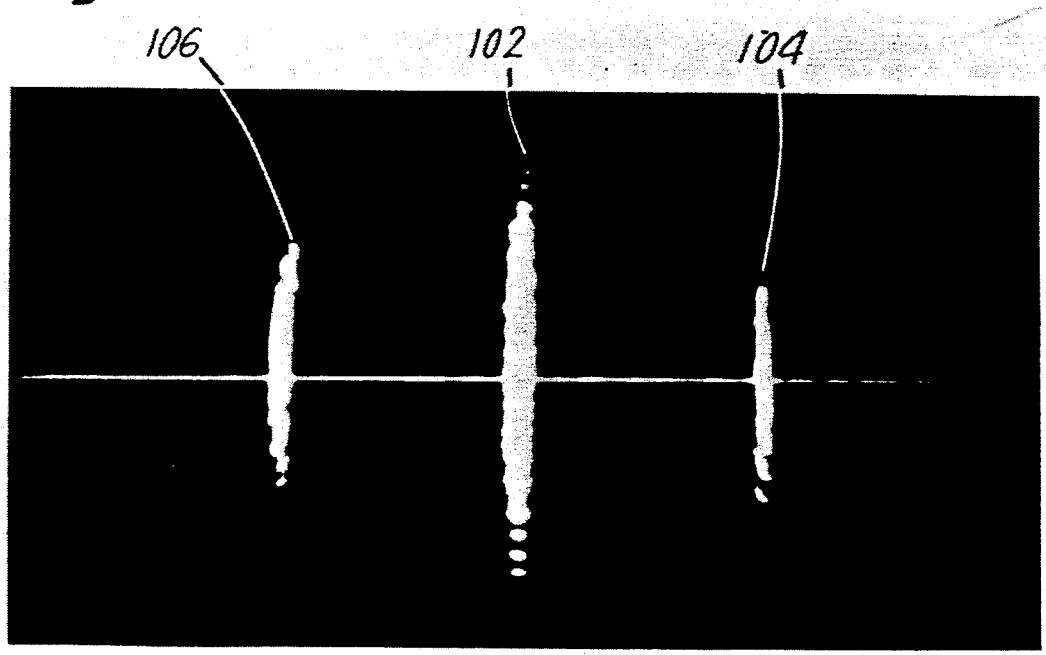
FIG. 11 provides reproductions of far field diffraction patterns produced by the FIG. 1 device.
Figure 11B:
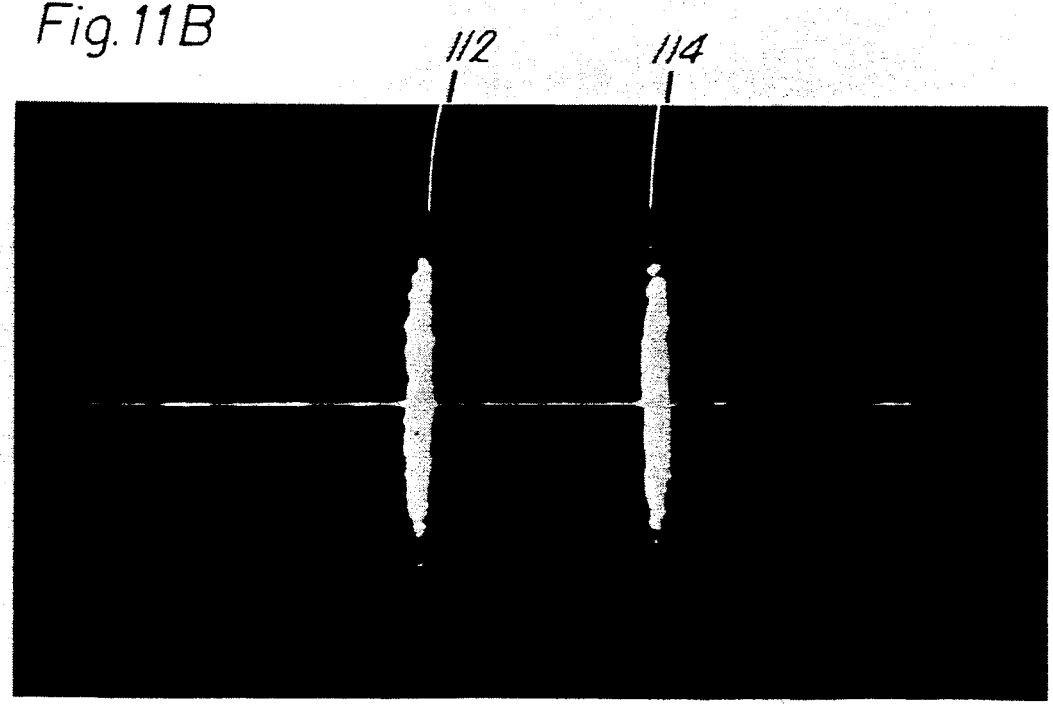

Referring now to FIG. 11, there are shown reproductions of two photographs of the far field diffraction patterns from which the intensity/angle graphs 100 and 110 of FIGS. 4 and 5 were produced. Features described earlier are like-referenced. The upper photograph 140 has a maximum 102 at 0° with subsidiary maxima 104 and 106 at $\pm 20°$ angular separation. The lower photograph 142 has maxima 112 and 114 at $\pm 10°$. Weaker features shown in FIGS. 4 and 5 are not detected. FIG. 11 demonstrates that the device 10 produces definition or resolution of maxima in the horizontal plane, ie the plane containing the axes of the waveguides 30. However, the device 10 does not greatly delimit intensity in the orthogonal dimension. This is evident from the spreading of maxima 102 etc in the vertical direction in FIG. 11. To reduce such spreading, a cylindrical lens may be employed to collimate or focus the array output. The cylindrical axis of the lens would lie int the plane of the waveguides and would be perpendicular to their length dimension.

The optical power handling capability of the device 10 has been investigated at 1.06 $\mu$m wavelength. Each waveguide 30 will tolerate at least 20 mW, providing a total of 200 mW for the ten waveguides of the device 10. Embodiments of the invention similar to the device 10 but designed for longer wavelengths would have linear dimensions scaled up in proportion to wavelength. For $CO_2$ laser radiation of 10.6 $\mu$m wavelength, the waveguide cross-sectional area would be one hundred times greater, giving a power handling capacity which is in principle at least 2 W per waveguide. Embodiments with large numbers of waveguides might therefore have large power capability as required for steering high power lasers. The limit for the device 10 and similar embodiments is set by heating in the aluminum layers 32, which absorb radiation form within the waveguides 30 and provide a loss of about 10 dB. This limitation is avoided in a PIN diode embodiment of the invention to be described alter with reference to FIG. 13. Both the device 10 and that to be described posses the advantage that very little electrical power is required for a given beam steering performance, and very much less than prior art devices.

Figure 12:
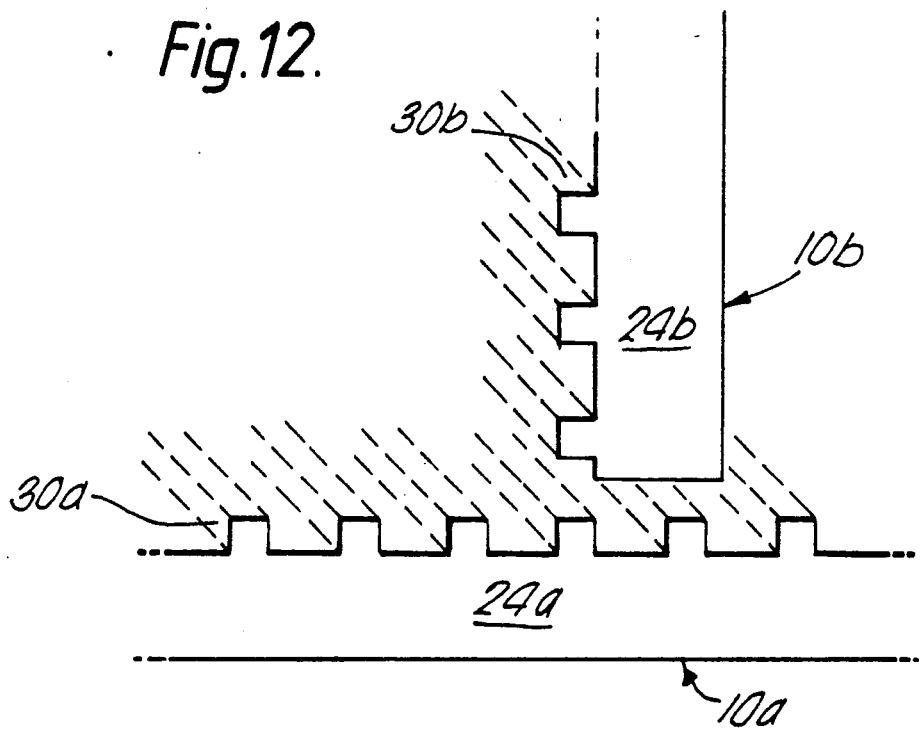
FIG. 12 schematically shows a further embodiment of the invention arranged for two dimensional beam steering.

Referring now to FIG. 12, in which parts previously described are like referenced, there is shown schematically in part two devices 10a and 10b of the invention. The devices 10a and 10b are arranged with their end or waveguide output faces 24a and 24b in the same plane. However, the waveguide arrays are arranged at right angles to one another to form a "T" configuration; ie the waveguides 30b are arranged in succession vertically above the center of the horizontal plane containing the waveguides 30a. This arrangement provides an approximately circular principal diffraction maximum steerable in two dimensions with appropriate waveguide bias voltages.

Other arrangements similar to that shown in FIG. 12 may be employed. An "L" configuration is one possibility; ie two devices 10 are employed with co-planar end faces 24 and perpendicular waveguide dispositions as before, but they are arranged edge to edge. Four devices may be arranged to form a hollow square. Alternatively, four devices 10 may be arranged in an "X" configuration, equivalent to two "L" arrangements corner to corner. In either case, the four devices might be assembled on a central bar backbone to which the four devices 10 are attached. Departures from symmetry may be accommodated to some extent by adjustment of waveguide bias voltages. It is in fact an important advantage of the invention that departures from design geometry may be ameliorated simply by biase voltage adjustment. Variation in waveguide bias voltage may be used to correct waveguide output phase discrepancies introduced by departures from ideal device geometry.

The FIG. 12 arrangement and related "L", hollow square and "X" configurations may be produced form assemblies of individual devices 10 constructed as previously described. Adjustment of a device 10 relative to one or more others may be carried out by known micromanipulation apparatus. After adjustment, an assembly of devices may be encapsulated in resin. Individual devices of such an assembly may be positioned relative to one another with the aid of observation of their combined light outputs. Each device may be arranged to produce a given diffraction pattern by waveguide voltage adjustment.

Two such patterns when combined form devices with correct relative positioning will produce a predeterminable combined pattern. Thus one device may simply be moved relative to the other until the required combined pattern is observed. It is of course important that the light input to each waveguide of each device does not alter during device movement.

Individual devices 10 in an assembly may be supplied with input light from a single source via a branched fiber optic coupler.

Figure 13:
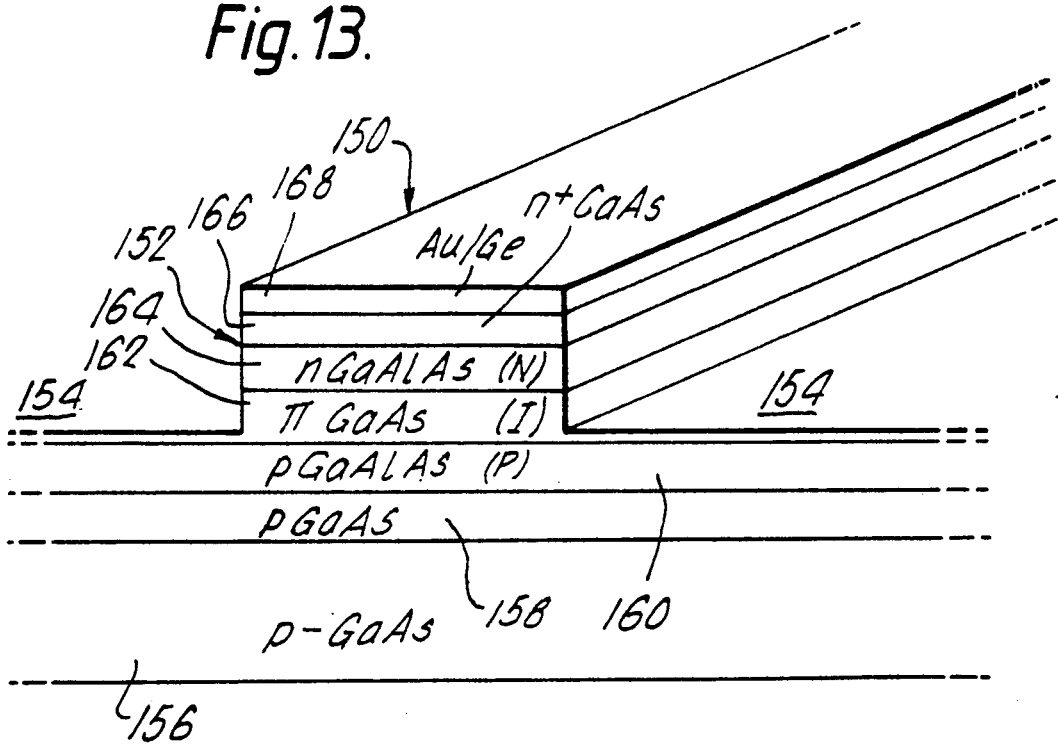
FIG. 13 is a schematic perspective view of an alternative embodiment of the invention comprising a PIN diode assembly.

Turning now to FIG. 13, part of an alternative embodiment 150 of the invention is illustrated schematically in part and in perspective (not to scale). The device 150 has a central waveguide 152 with neighboring grooves 154 on either side. Only one waveguide is shown for the purposes of simplicity of illustration, but in practice the multiple waveguide/groove structure previously described for the device 10 is employed.

The device 150 comprises a p-type GaAs substrate 156 bearing p-type GaAs buffer layer 158 1 $\mu$m thick. The layer 158 is optional, and may be omitted. This combination is surmounted by a p-type $Ga_{0.9}Al_{0.1}As$ lower cladding layer 160 1 $\mu$m thick with a Zn dopant concentration of $5 \times 10^{17}$ cm$^{-3}$. The layer 160 bears a waveguide layer 162 of $\pi$-type (undoped but residual p-type) GaAs having a dopant concentration of $10^{15}$ cm$^{-3}$. The layer 162 provides the core of the waveguide 152 and is 1 $\mu$m thick over this region. It also provides the lower surfaces of grooves 154, and in these regions is 0.2 $\mu$m thick. The waveguide region of layer 162 is surrounded by an n-type $Ga_{0.9}Al_{0.1}As$ upper cladding layer 164 1 $\mu$m thick with an Si dopant concentration of $10^{17}$ cm$^{-3}$. This in turn bears a 0.3 $\mu$m thick layer 166 of n+ GaAs with an Si dopant concentration of $3 \times 10^{18}$ cm$^{-3}$. An ohmic contact layer 168 of Au/Ge alloy covers the n+ layer 166.

The waveguide 152 constitutes a PIN diode structure, in which layers 160, 162 and 164 constitute the P, I and N regions respectively. Light is guided in the I region of diode, ie layer 162. In operation the diode is reverse biased, which provides a high electric field in the I region of layer 162. Operation of the device 150 extended to a multiple groove/waveguide structure is equivalent to that previously described for the device 10. The device 150 possesses the advantage that, unlike the device 10, there is no metal layer in contact with the waveguide layer 162 which would provide attenuation of the transmitted optical intensity. It is of course possible to modify the device 10 by introducing an undoped upper cladding layer equivalent to layer 164 between waveguide core layer 18 and aluminium layer 32 to inhibit absorption.

A practical embodiment of the device 150 would incorporate a number of waveguides 152 and grooves 154 optically joined to an input regions equivalent to the rear region 41 in the device 10 between the rear face 26/28 and the waveguide inputs. However, by virtue of n+ layer 166, the rear region of the device 150 would short circuit together the equivalent of connections 33 between electrodes 33 and bond pads 34. This is easily obviated in practice. Each waveguide 152 is notched at its light input end through layer 166, the notch extending partly into the layer 164. The rear region of the n+ layer 166 (but not the waveguides 152) is then coated with dielectric such as polyimide, which also fills the notch. Metallized bond pads and connections thereto equivalent to elements 33/34 described earlier overlie the rear region dielectric coating and are insulated from one another, but provide connections to individual waveguide ohmic contacts 168.

Figure 14:
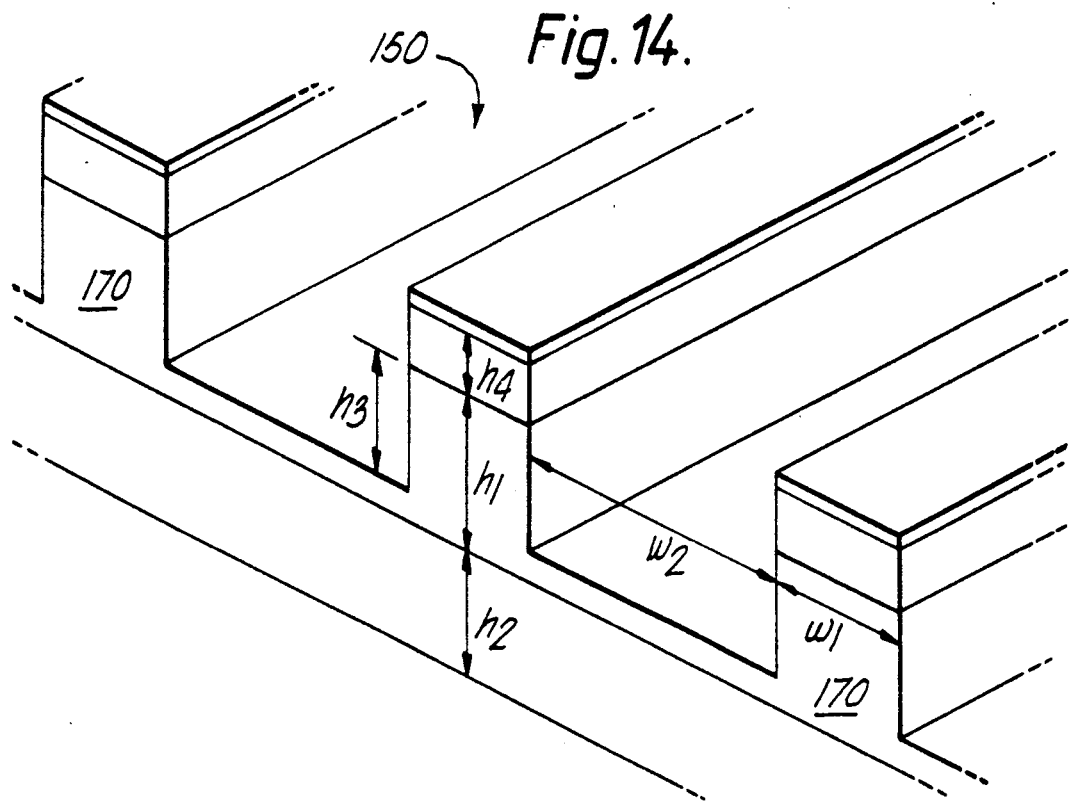
FIG. 14 is an idealized perspective drawing of an end face of the FIG. 13 device providing dimensional parameters.

Preferred design parameters of the device 150 are illustrated in FIG. 14, in which parts previously described are like-referenced. This drawing is a perspective view of the end face 170 of the device 150, and parameters $h_1$ to $h_4$, $w_1$ and $w_2$. In addition, the device 10 has parameters L, D and P not illustrated. Other than $h_4$, these parameters are as defined for the device 10. The parameters $h_2$, $h_3$, $w_1$, $w_2$, L, D and P have the values quoted in Table 2. Parameter $h_1$ for the device 150 differs from that for the device 10, and should be in the range 0.5 λ to 1.0 λ. Parameter $h_4$ is the thickness of $n^+$ layer 166, and should be 0.5 λ or greater.

The optical beam steering device of the invention may be employed in optical read and write applications. Writing merely requires any of the foregoing embodiments to be employed with a light sensitive surface to receive the diffracted beam. Unwanted diffraction orders may be removed by collimation of the waveguide outputs. Alternatively, larger numbers of waveguides with closer packing may be incorporated in the device. This allows a narrower principal maximum to be obtained and subsidiary maxima shifted to greater diffraction angles.

Figure 15:
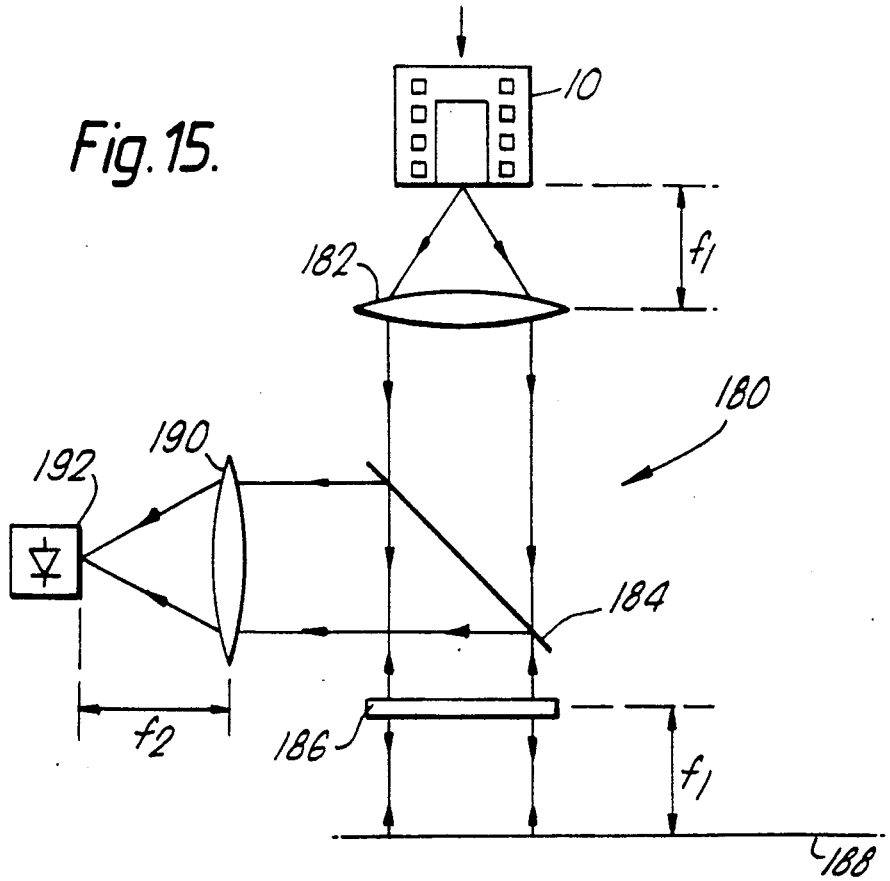
FIG. 15 illustrates use of the invention in an optical read application.

An optical reader incorporating a device 10 of the invention is illustrated schematically in plan in FIG. 15, and is indicated generally by 180. The reader 180 comprises a first spherical lens 182 distant its focal length $f_1$ from the device 10. Light from the device 10 passes via the lens 182 to a 45° inclination beam splitter 184, and thence to a cylindrical lens 186 having a focal length $f_1$. The lens 186 has an axis of curvature int he plane of the drawing and perpendicular to the line from its center to the device 10. Light passes through the lens 186 to an optical disc 188 from which data is to be read. The lens 186/disc 188 separation is equal to $f_1$. Light reflected from the disc 188 returns through the lens 186, and is reflected at the beamsplitter 184. A third lens 190 with a focal length $f_2$ focuses light from the beamsplitter 184 on to a GaInAs photodiode detector 192 with a photosensitive area (not shown) 40 μm by 10 μm in extent (for $f_1=f_2$). The lens 190/photodiode 192 separation is equal to $f_2$.

The optical reader 180 operates as follows. Light from the device 10 is rendered parallel and collimated to remove unwanted subsidiary maxima by the first lens 182. The cylindrical lens 186 focuses the light to a small spot on the surface of the disc 188; i.e. the lens 186 counteracts beam divergence in the direction normal to the plane of the device 10, which would otherwise occur as illustrated in FIG. 11. A real image of the waveguide outputs of the device 10 is formed by the third lens 190 on the surface of the detector 192. The image size is $f_2/f_1$ times the size of the light output region of the device 10. The image is high or low intensity according to whether or not the optical disc 188 is reflective at the point where the incident light is focused on it. The detector 192 accordingly provides a digital high or low voltage output corresponding to the bit value encoded on the disc 188 at the relevant point. The light focus is scanned in one dimension (in the plane of the drawing) by altering the waveguide voltages applied to the device 10. This provides for successive adjacent bits encoded on the disc 188 to be read and output from the detector 192. The disc 188 is subsequently rotated to enable further information to be read. Using the arrangement of FIG. 12, two dimensional electro-optic reading may be implemented, obviating the need for the disc 188 to be rotated.

Each waveguide 30 of the device 10 may be subject to digital electronic control of output phase, in order to provide beam steering or scanning in the optical reader 180 and other applications. For repetitive sequential scanning, each waveguide might receive a sequence of bias voltages from a respective digital to analog (D/A) converter supplied with digital waveguide voltage information from a respective memory. Clock signals supplied to the memory would accordingly produce successive waveguide output beam phase values. Clocking all the memories synchronously would therefore produce successive principal maximum positions in the far field diffraction pattern of the device 10, as previously described with reference to FIGS. 4 and 5.

The detector 192 of the FIG. 15 device 180 is of a known type capable of at least 5 GHz operating rate. The device 10 is capable of responding to applied waveguide voltages at rates in excess of 1 GHz from capacitance considerations. Using memories and D/A converters to provide waveguide voltages, memory clock rates of up to 0.3 GHz may be implemented with known digital electronic devices. The limiting factor on optical beam steering speed lies in conventional electronics, rather than arising out of the invention.

Figure 16:
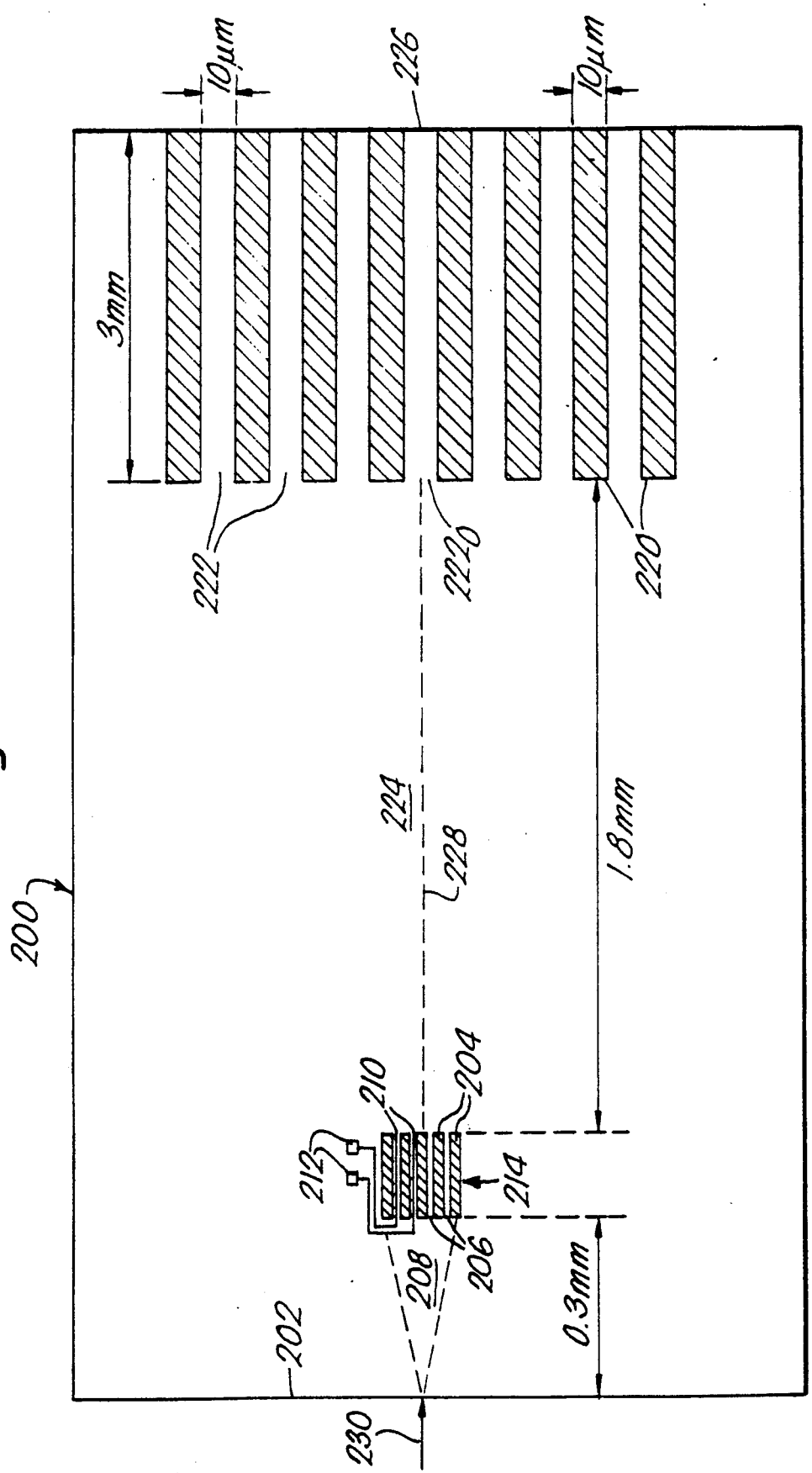
FIG. 16 schematically shows a plan view of an embodiment of the invention arranged as a single pole, multi-way optical switch.

Referring now to FIG. 16, which is not to scale, there is schematically shown a further device 200 of the invention, and which may be considered as a one to N way switch. The device 200 is shown in plan, and is a semiconductor multi-layer structure having successive layer (not shown) in accordance with FIG. 1.

The device 200 has a light input edge 202 and a first set of grooves 204 (indicated by shading) which are stopped at both ends. The grooves 204 define intervening beam steering waveguides 206, and are etched down to a buried waveguide lower cladding layer (not shown) as previously described. For convenience of illustration, only five grooves 204 and four waveguides 206 are shown. However, these are intended to represent ten waveguides as in the device 10 described with reference to FIGS. 1 and 6 to 9. The grooves 204 are distant 0.3 mm from the input edge 202 to provide an intervening light spreading region 208. Aperture stop means (not shown) may be provided to avoid input light bypassing the grooves 204. The groove and waveguide dimensions are as set out in Table 2. The waveguides 206 have electrodes 210 connected to bond pads 212, of which two of each are illustrated. Elements 202 to 212 define a beam steering device 214 equivalent to the device 10.

A second set of eight grooves 220 is etched down to the buried cladding layer, and defines seven receive waveguides 222. The receive waveguides 222 are arranged to accept light form the beam steering waveguides 206, and are separated from them by a central ungrooved region 224 1.8 mm in length. The grooves 220 and waveguides 222 are 3 mm in length, 10 μm in width, and have depth dimensions equal to the equivalent for grooves 204 and waveguides 206. The receive waveguides 222 terminate at an end face of the device 200 having an edge 226, and from which optical output is obtained. As indicated by a chain line 228, the center of the device 214 is aligned with a central receive waveguide $222_0$. The line 228 corresponds to an undeflected output beam direction.

The device 200 operates as follows. Light indicated by an arrow 230 is focused on an end face of which edge 202 is illustrated. The light diverges in spreading region 208 and reaches the beam steering waveguides 206. The output beam from the waveguides 206 in central region 224 is directionally controlled by voltages on the electrodes 210. As previously described with reference to FIGS. 4 and 5, a central diffraction maximum from the device 214 is steerable over a 20° interval from +10° to −10°. A 10° angle to the undeflected output direction 228 corresponds to a deflection of over 80 μm at the receive waveguides 222. However, deflection from the central receive waveguide $222_0$ to one outermost requires only a deflection of 60 μm. Moreover, the device 214 has a beamwidth of 1.5°, which is approximately equal to the angle subtended by each receive waveguide 222 at the beam steering waveguides 206. Consequently, the output beam from the device 214 is accepted by only one of the receive waveguides 222 at a time, and the beam is switchable to any one of the receive waveguides by applying appropriate voltages to the bond pads 212. The device accordingly acts as a one to seven way optical switch actuated electronically.

The light emerges from the device 200 at the end face 26 where the receive waveguides 222 terminate. The light is confined to one of the waveguides 222 selected in accordance with bond pad voltages. The device 200 may be part of a larger semiconductor chip or wafer (not shown) incorporating additional optical or electro-optic processing. In particular, the receive waveguides 222 might terminate at respective detectors providing electrical signals for subsequent processing.

Figure 17:
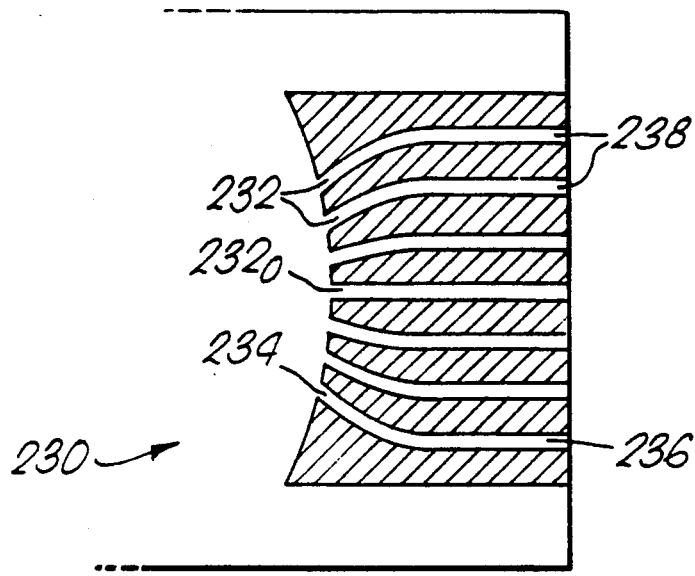
FIG. 17 schematically shows a plan view of an alternative receive waveguide structure for the FIG. 16 device.

Referring now also to FIG. 17, an alternative receive waveguide structure 230 for the device 200 is shown. The structure 230 has individual waveguides such as 232. The central waveguide $232_o$ is straight, but others have a curved input region and a straight region such as 234 and the effect of input region curvature is to increase the separation between adjacent waveguide outputs 238, as may be convenient for subsequent optical and/or electro-optic processing purposes. This also ensures that light collection by the receiving guides is efficient, especially at large deflection angles.

The embodiments 10 and 150 of the invention are heterostructures involving more than one semiconductor material, and have undoped waveguides 30 and 152 respectively. Embodiments of the invention may however be designed which incorporate doped waveguides, which increases electro-optic properties and allows shorter waveguides to be employed. GaAs waveguides may be doped with Si at a concentration of $10^{17}$ cm$^{-3}$. Each waveguide may alternatively be a multiple quantum well structure, which may improve electro-optic properties.

The invention may also be implemented as a semiconductor homostructure in silicon for example. Silicon has no linear electro-optic effect, but the quadratic and doping effects may be employed. It is necessary to produce a waveguide having a core bounded by media of lower refractive index, and refractive index may be reduced by increasing doping. One possible silicon structure is a p$^+$-n$^-$-n$^+$ arrangement, in which a lightly doped central waveguide region is sandwiched between degenerately doped ($\approx 10^{18}$ cm$^{-3}$) layers of mutually opposite conductivity type. Waveguides may be separated in the horizontal plane by intervening grooves as in earlier embodiments. Alternatively, the separating regions may themselves be doped to reduce refractive index. However, in this case waveguide electrodes would require to be insulated from the separating regions to avoid their being short circuited. Doping level changes and/or insulation may be achieved by proton isolation techniques.

The invention may be implemented in group III-V material systems other than GaAlAs, e.g. GaInAsP. It may also be implemented in group II-Vi semiconductor materials such as CdTe and CdHgTe. CdTe provides substantial electro-optic effects, about four times stronger than that of GaAs, and the CdHgTe material system would be appropriate for longer wavelength infrared applications. ZnSe waveguides may be employed for visible wavelength in the blue-green region around 500 mm.

The device 10 of the invention previously described operated at 1.06 μm wavelength. More generally, similarly constructed devices of the same material but different waveguide geometry may be constructed for wavelengths up to 12 μm. This would require longer waveguides, but would be within the scope of current lithographic technology. It is of potential relevance for infrared systems operating in the 3-5 μm and 8-11 μm regions.

Applications of the invention previously described have been confined to beam steering. The device may also be employed for optical signal processing by imposing intensity modulation on light travelling down device waveguides and exploiting Fourier transforming properties arising from diffraction. The device 10 might also provide an absorption modulator if operated at a wavelength less than 1 μm where GaAs is electro-absorbing. It might then perform as an amplitude or phase control spatial light modulator. The invention may also provide a miniaturized optical spectrometer. The device 10 for example might be employed with a single receive waveguide, and beam steering of the diffraction pattern would produce wavelength scanning of the receive waveguide input light. Alternatively, such an arrangement operated at a single wavelength might provide a programmable optical waveform generator employing beam deflection or width control to produce modulation of light intensity at the receive waveguide.

The invention may also provide a wavelength demultiplexing device similar to the device 200 of FIG. 16. A light beam comprising a mixture of individual wavelengths passes through the waveguides 206. Waveguide voltages are then adjusted to provide for each receive waveguide 222 to receive a single respective wavelength. This therefore provides wavelength demultiplexing, since the original multi-wavelength beam has been divided into individual beams each of single wavelength.

In embodiments of the invention previously described, light output from waveguides such as 30 in the device 10 was in the form of plane waves, this being achieved by adjustment of waveguide bias voltage. It is also possible to generate non-planar wavefronts by bias voltage control, as may be required to produce one or more light foci or to correct aberrations in an optical component or instrument. Control over wavefront shape is enhanced by increasing the number of waveguides in an array, and by reducing their width and spacing. It is envisaged that a wavefront control array for use at 1.06 μm wavelength might incorporate some hundreds of waveguides each less than 1 μm wide with a spacing of less than 2 μm between adjacent waveguide centers. These criteria have the effect of ensuring that higher diffraction orders occur at large angles to the array boresight (undeflected) direction. They consequently do not interfere with the main optical beam. The discrete nature of each waveguide then becomes insignificant. Under these circumstances, the array is biasable to act as an electronically controlled light wavefront generator. If the pitch or center-to-center spacing of adjacent guides were to be less than or equal to half the free space optical wavelength, the discrete nature of waveguides in the array may be neglected completely and higher diffraction orders would not be present.

Figure 18:
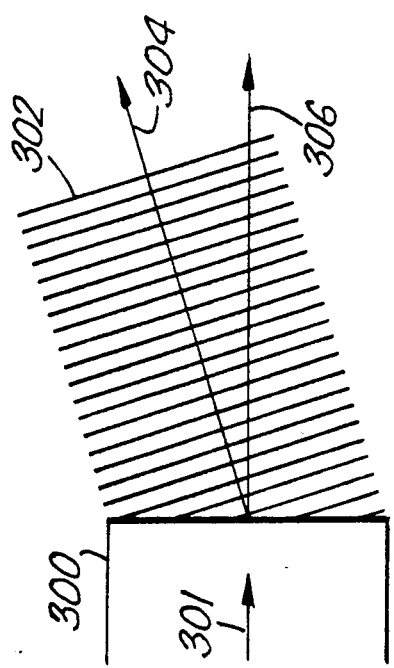

FIGS. 18 to 21 schematically show a waveguide array 300 under differing waveguide bias conditions producing respective optical wavefronts. These drawings are like-referenced, and indicate wavefront control with an array of hundreds of closely spaced (<2 μm) narrow (<1 μm) waveguides using light of 1.06 μm wavelength. In FIG. 18, light 301 progressing along array waveguides (not shown in detail) produces light output wavefronts such as 302 which are planar. They progress in a direction indicated by an arrow 304 inclined at an angle to the array boresight or undeflected direction 306. Plane waves such as 302 inclined to the undeflected direction 306 are obtained when the waveguide output phase varies linearly with distance across the array 300.

Figure 19:
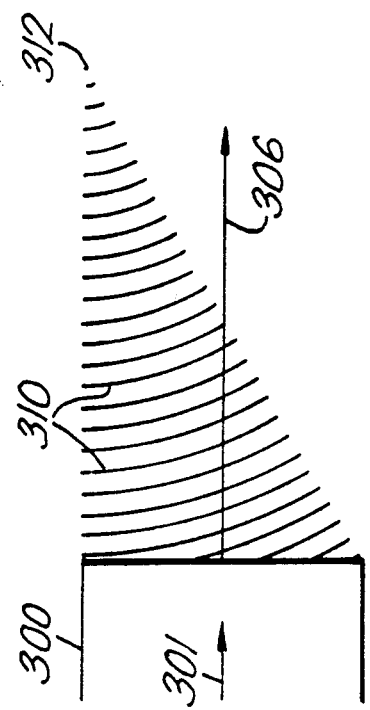
FIGS. 18 to 21 illustrate optical wavefront control with a device of the invention.
Figure 20:
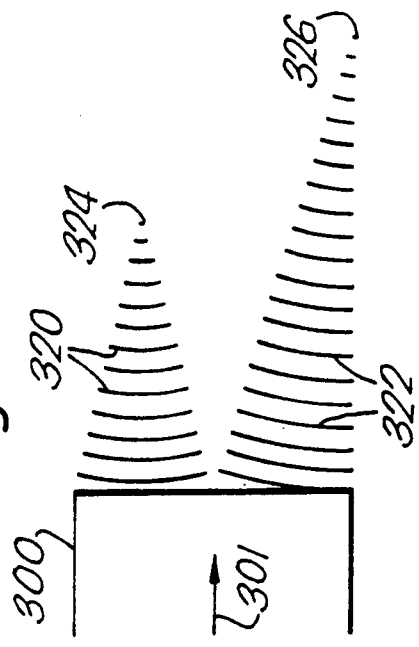

FIG. 19 illustrates the array 300 producing curved wavefronts such as 310 converging to a focus 312 displaced from the undeflected direction 306. The wavefronts 310 are produced by biasing the waveguides so that their output phase changes nonlinearly in a monotonically varying manner across the array 300. Focusing in this manner may be employed to shorten the distance between the array 300 and formation of the main lobe of its diffraction pattern. It also provides a degree of sidelobe suppression. FIG. 20 illustrates a similar situation, but here the array 300 produces two independent sets of curved wavefronts 320 and 322 converging to respective foci 324 and 326. In this case the array 300 is effectively in two parts. In each part the waveguide output phase changes nonlinearly in a monotonically varying manner.

Figure 21:
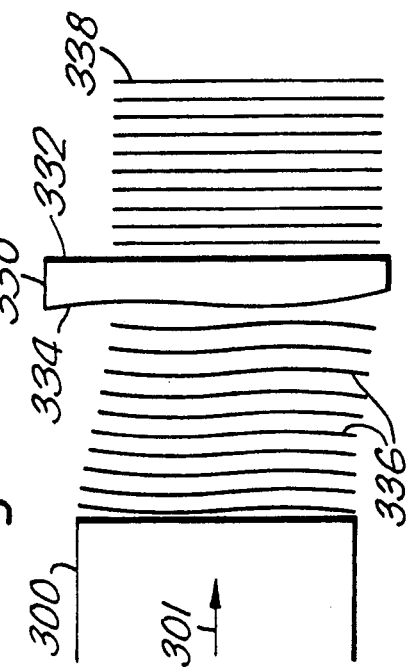

FIG. 21 illustrates the array 300 arranged to compensate for aberrations in an optical component 330. The component 330 has a planar face 332 and a second face 334 which is partly convex and partly concave. This necessarily would distort a plane wavefront (not shown) passing through the component. The array output phases at individual waveguides are controlled so that the array 300 outputs wavefronts such as 336 which are non-planar. The wavefronts 336 arranged to have a phase variation which is the conjugate of that which would be imposed on a plane wave by the component 330. When the wavefronts 336 pass through the component 330, their phase variation is cancelled out to produce plane waves such as 338. The array 300 may alternatively be arranged to produce wavefronts corresponding to convergent waves with a superimposed phase distortion conjugate to that imposed by the component 330. In this case wavefronts emerging form the component 330 would be converging.

For the production of plane waves illustrated in FIG. 18, and at deflection angles less than 20° either side of the central direction 306, the effective beamwidth b at a distance s from the array is approximately given by $$b = d + \frac{1.2\lambda s}{d} \quad (7)$$

where d is the width of the array (sum of waveguide center spacings) and λ is the free space wavelength.

For focusing as illustrated in FIG. 19, the diffraction limited beamwidth b' is approximately given by $$b' = \frac{1.2\lambda s}{d} \quad (8)$$

Equations (7) and (8) show that the advantages of focusing the beam become significant at distances s where the diffraction limited beamwidth b' is small compared to the array width d. For example, with d=1 cm, λ=10$^{-4}$ cm (1 μm), then for s=300 cm, b=1.0 cm and b'=0.035 cm, whereas s=10$^4$ cm gives b=2.2 cm and b'=1.2 cm.

The advantages of phase control focusing with a device of the invention include the ability to increase illumination intensity and address finer detail in a scanned field remote form the array. This is beneficial in imaging and optical storage systems. Furthermore, the position of the focus may be altered both in terms of deflection from the boresight direction and as regards distance from the array (zooming). Zooming or varying the focus distance allows the range of an object in the far field to be ascertained form measurements of the rate of change of the light intensity reflected from the object. Alternatively, pulse-echo techniques may be employed, which involve measuring the time delay between emission and return of optical pulses.

The focusing action of the array 300 shown in FIG. 19 would also be beneficial in the case of a one to N way switch (see FIG. 16), since it would allow use of narrower receive waveguides.

Figure 22:
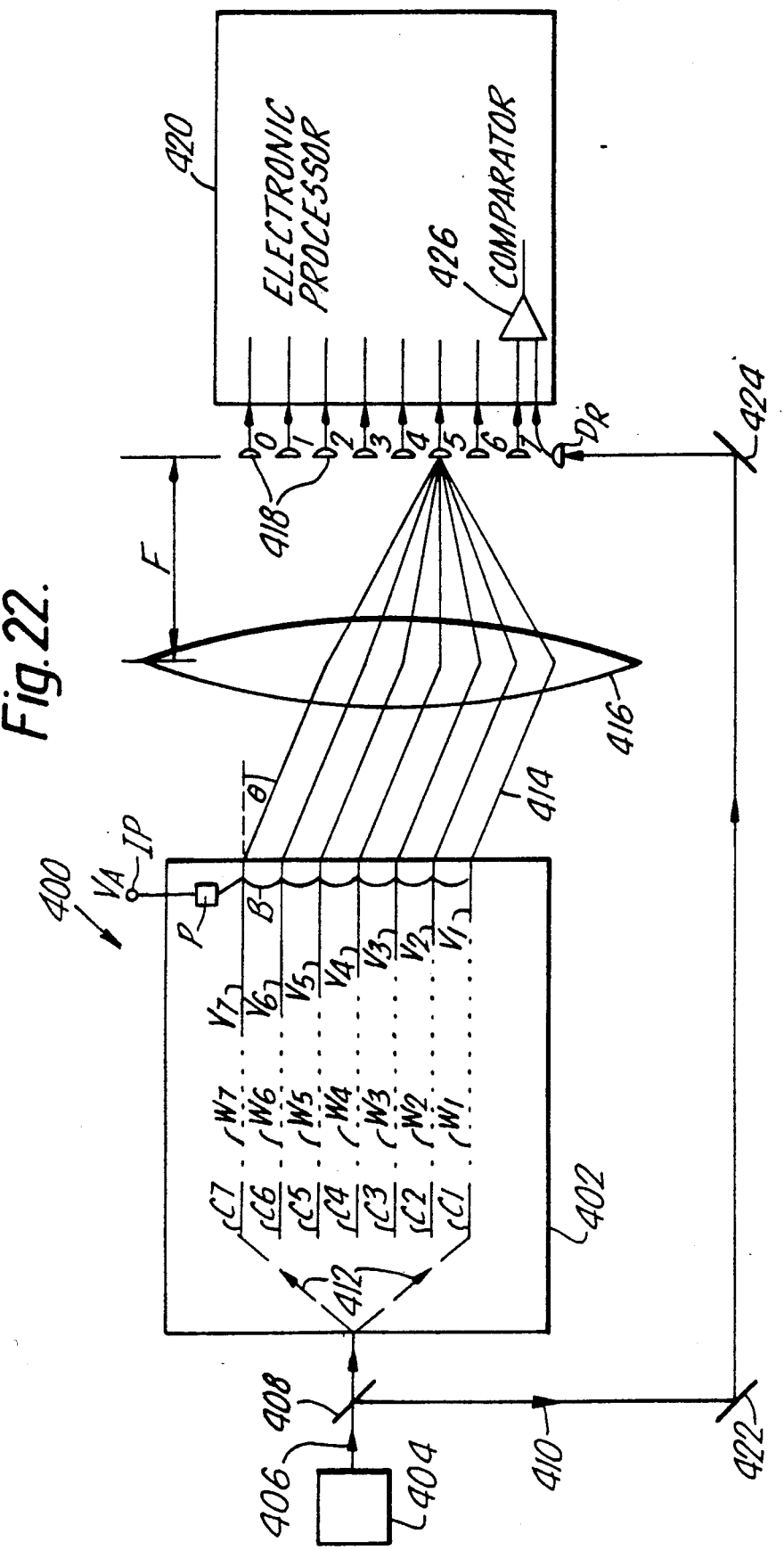

Referring now to FIG. 22, there is schematically illustrated a further embodiment of the invention indicated generally by 400, and in the form of an analog to digital converter (ADC). The ADC 400 incorporates an optical beam steering device 402 similar to that illustrated in FIG. 1, but with increased length and differing electrode structure. The device 402 has seven electro-optic waveguides, of which inner regions are indicated by respective dotted lines $W_1$ to $W_7$. Each of the waveguides $W_n$ (n=1 to 7) is surrounded by a respective phase calibration electrode $C_n$ and a respective phase variation electrode $V_n$, each electrode pair $C_n$-$V_n$ being arranged over mutually opposite end lengths of the respective waveguide $W_n$ in each case. The calibration electrodes $C_1$ to $C_7$ are of equal length, but the phase variation electrodes $V_1$ to $V_7$ have lengths proportional to waveguide number n; i.e. electrode $V_n$ has a length proportional to n. The phase variation electrodes are connected together by bridging links such as B arranged over inter-waveguide grooves (not shown), and are connected to a common bond pad P. A voltage input IP is connected to the bond pad P. The calibration electrodes $C_1$ to $C_7$ have individual connections to respective bond pads (not shown) as illustrated in FIG. 1 at 33–34.

A pulsed laser 404 produces a light beam 406 which passes to the device 402 via a beamsplitter 408. Part of the laser intensity is diverted by the beamsplitter 408 to form a reference beam 410. Light incident on the device 402 diverges to input ends (not shown) of the waveguides $W_1$ to $W_7$ as indicated by chain lines 412. Light output form the waveguides is indicated by lines such as 414, and is focused by a lens 416 on to a vertical planar array 418 of detectors, of which one horizontal line of detectors is illustrated. Individual detectors are indicated by D symbols with reference suffixes 1 to 7. Output signals from the detector array 418 pass to a digital electronic processor 420. The reference beam 410 is reflected by mirrors 422 and 424 to an array (not shown) of reference detectors, each reference detector being paired with a respective detector $D_o$ to $D_7$. The drawing shows one reference detector $D_R$ associated with detector $D_7$, other reference detectors being omitted to reduce illustrational complexity. Each pair of detectors such as $D_7/D_R$ is connected to a respective comparator incorporated in the processor 420, one such comparator being shown at 426. Each comparator is a high speed device.

The ADC 400 operates as follows. The input IP is connected to earth potential, and the calibration electrodes $C_1$ to $C_7$ are connected to respective bias potentials providing for output light 414 to be focused by the lens 416 on to detector $D_o$. This is a calibration procedure, and the calibration electrode bias potentials are subsequently kept fixed. An analog voltage $V_A$ is then applied to the input IP to the phase variation electrodes $V_1$ to $V_7$. The electrodes $V_1$ to $V_7$ all receive this voltage via the bridging links B. The length of the nth electrode $V_n$ (n=1 to 7) is proportional to the waveguide number n. Accordingly, the length of the nth waveguide $W_n$ over which an electric field (and hence an electro-optically induced change in refractive index) is experienced is proportional to n. Under these circumstances, the beam shape produced by the lens 416 at the detector array 418 is substantially preserved, but the output light beam 414 is steered through an angle $\theta$ indicated in the drawing. Moreover, $\theta$ is directly proportional to the input voltage $V_A$. This involves the approximation $\theta = \sin \theta$, which is appropriate in optics generally. At the detector array 418, the beam focus is deflected away from detector $D_o$ by a distance proportional to $V_A$. The focus reaches a detector $D_m$ say (m=0 to 7), where m is proportional to $V_A$. Consequently, identification of which of the detectors $D_o$ to $D_7$ is illuminated provides a measure of $V_A$. As has been said, each detector is paired with a reference detector, e.g. $D_7/D_R$, and input light from the laser 404 is pulsed. Each laser pulse is divided into two parts by the beamsplitter 408. In the absence of a laser pulse, the detector pair $D_7/D_R$ outputs like signals to the comparator 426, which produces a zero output. When a laser pulse reaches a reference detector such as $D_R$, its output becomes non-zero. This output signal is reduced at a potential divider (not shown) at the input to comparator 426, and causes an intermediate comparator output voltage level. When the light beam 414 is focused on to a detector such as $D_7$, a high comparator output voltage level is produced. Consequently, the comparators distinguish between presence and absence of a laser pulse, and indicate which of the detectors $D_o$ to $D_7$ is illuminated. Illumination of the mth detector $D_m$ corresponds to an input voltage $V_A$ proportional to m, and is used to generate a binary word corresponding to the input analog voltage. This demonstrates that the ADC 400 provides analog to digital conversion.

Figure 23:
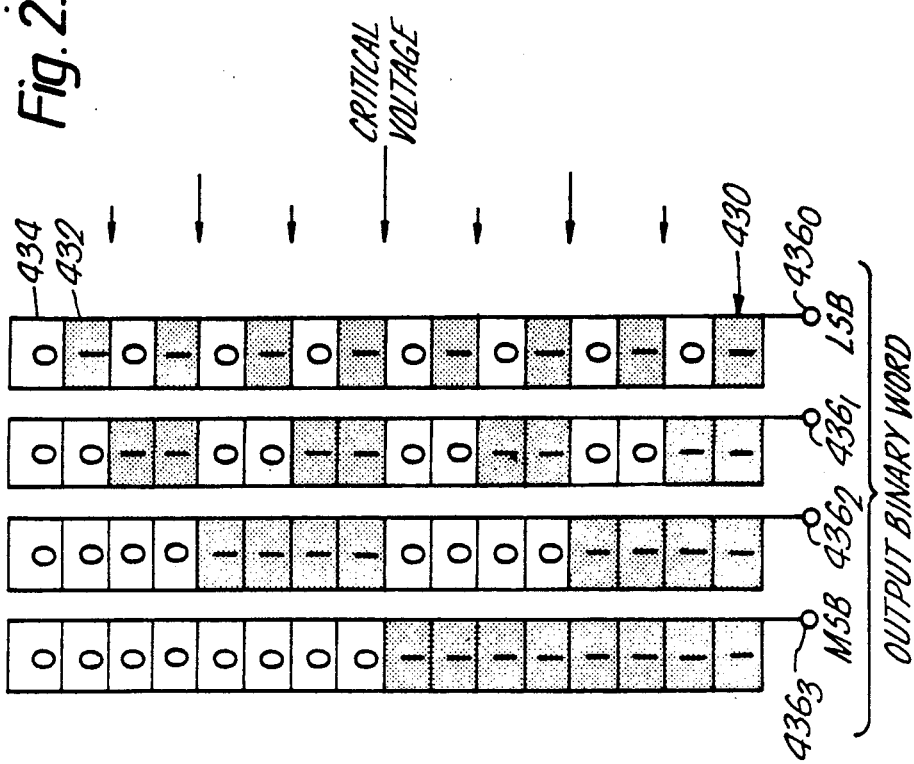

Referring now also to FIG. 23, a two dimensional coded detector array construction 430 is illustrated schematically in a form suitable for use in conjunction with the ADC 400. The coded array 430 is arranged to provide a binary digit representation of the input analog voltage $V_A$. The array 430 comprises detector locations indicated by squares such as 432 (shaded) and 434 (unshaded), and arranged in four columns and sixteen rows. Shaded squares 432 correspond to locations occupied by detectors and unshaded squares 434 to unoccupied locations. Column output terminals are stimulated by black dots $436_o$ to $436_3$, detector output processing by comparators 426 not being shown. The coded array 430 is arranged with respect to the FIG. 22 or ADC 400 embodiment such that a line of light produced by the lens 416 falls on one row of detector locations at a time. As indicated by digits 1 or 0 within detector locations 432/434, illumination of an occupied detector location gives rise to a binary 1 output, whereas a binary 0 arises from illumination of an unoccupied location. Consequently, deflection of the line of light by an input voltage $V_A$ proportional to a value in the range 0 to 15 in a bit parallel manner at column outputs $436_o$ (least significant bit or LSB) to $436_3$ (most significant bit or MSB). This demonstrates direct conversion of an analog voltage $V_A$ to a digital output.

The coded array 430 suffers from the disadvantage that uncertainties may arise from light falling partly on one detector and partly on a column neighbor. At a critical input voltage $V_A$ between 7 and 8 in FIG. 23, all four digits are intermediate changes from 0 to 1 or 1 to 0. At other voltages, changes of 2 or more digits can occur simultaneously. To avoid uncertainty in more than one digit the Gray Code array format of FIG. 24 may be employed. This drawing shows an alternative array 440 arranged so that movement of the line of light between adjacent rows never involves change of more than one digit. It will not be described in detail, since it is equivalent to FIG. 23 in all but detector location occupancy. The Gray Code output is readily convertable to conventional binary format.

The ADC embodiment 400 employs phase variation electrodes $V_1$ to $V_7$ of differing length to produce a constant electric field across varying lengths of waveguides $W_1$ to $W_7$. The same effect may be achieved by the use of electrodes of constant length having varying voltages applied thereto. In this case, the input analog voltage is applied in full to a first phase variation electrode but is reduced in successive potential division stages for application to successive electrodes. The effect is to produce linearly decreasing fields in successive electrodes of constant length, as opposite to constant fields in electrodes of linearly decreasing length in the ADC 400. These two approaches are equivalent, and both provide beam steering in proportion to input voltage $V_A$ provided phase shift is linearly proportional to voltage.

As illustrated in FIG. 2, the electro-optic variation $\Delta n$ in refractive index may be nonlinear with electric field. In this case, the positions of the detectors $D_o$ to $D_7$ in FIG. 24 or detector locations in FIGS. 23 and 24 may be adjusted to compensate; i.e. the center to center spacing of adjacent detectors may be nonlinearly varying to compensate for nonlinear electro-optic effects.

The ADC 400 incorporates a reference light beam path via mirrors 422 and 424. This path may be integrated as a waveguide within the semiconductor wafer in which the device 402 is formed. Similarly, the lens 416, detector array 418 and processor 420 may be integrated in such a wafer. The lens function may alternatively be obtained as illustrated in FIG. 20 by introducing an additional phase variation across the waveguides $W_1$ to $W_7$.

Referring now to FIG. 25, there is shown a further embodiment 450 of the invention arranged as a digital-to-analog (D/A) converter. The D/A converter 450 comprises an array 452 of four waveguides with respective electrodes indicated by lines $m_1$ to $m_4$. The waveguide electrodes are connected to respective voltages $V_1$ to $V_4$, each of which corresponds to a digital 1 to 0. The waveguides $m_1$ to $m_4$ receive light from a laser diode 454 via an amplitude adjuster 456 to be described later in more detail. The laser output is monitored by an auxiliary detector 458 via a lens 460, and the detector output is employed to control a laser power supply 462 and provide laser amplitude stabilization. Light is output as a plane wave from the waveguide array 452, and passes via a neutral density filter array 464 providing attenuation by a factor of $2^{n-1}$ to the nth waveguide (n=1 to 4); i.e. the first waveguide output is not attenuated but successive waveguide outputs are halved compared to that preceding. Individual filters are shown as vertical lines, and each filter provides 50% attenuation. Light from the filter array is focused by a lens 466 on to a diode detector 468 arranged to respond to total incident light intensity.

The amplitude adjuster 456 comprises a respective Mach Zehnder interfoerometer structure (not shown) for each of the waveguides $m_1$ to $m_4$. Each such structure comprises an input waveguide region which subsequently divides into two arms. The arms later recombine to a single output waveguide arm connected to a respective one of the waveguides $m_1$ to $m_4$. Each arm has a respective biasing means, and the phase of light in one arm is electro-optically advanced while the other is retarded. The result is constant average phase but variable amplitude in the output waveguide arm and the respective waveguide $m_n$, since the interference between waves emerging form the two divided arms varies with their relative phase shift. The amplitude adjuster therefore provides means for achieving equality of amplitude between the light inputs to the waveguides $m_1$ to $m_4$. Mach Zechnder interferometers structures in lithium niobate integrated optics are well known and will not be described further.

The output wavelength from the laser 454 is arranged to be in the vicinity of the semiconductor band edge in the material of the waveguides $m_1$ to $m_4$ to provide for electro-absorption. Electro-absorption is an electro-optic effect which is related indirectly to electro-refraction employed in earlier embodiments. It provides for movement of the semiconductor band edge in response to electric field, with consequent change in absorption at the laser wavelength.

Consequently each waveguide transmits or absorbs the light within it according to whether or not there is a voltage applied across it. If the intensities output by the waveguides are equal, then the intensity sum S received by the detector 468 is given by:

$$S = \tfrac{1}{8} A(8V_1 + 4V_2 + 2V_3 + V_4)$$

where A is a constant and $V_1$ to $V_4$ may each take digital bit values 0 or 1. The detector 468 consequently provides an analog output proportional to the binary digital input word $V_1V_2V_3V_4$. The device 450 therefore provides 4-bit D/A conversion. Additional waveguide channels may be provided to accommodate larger numbers of bits.

The device 450 may dispense with the filter array 464 if the amplitude adjuster 456 is arranged to provide waveguide input intensities which are weighted to double in magnitude in successive steps up the waveguide array 452. The laser 454 may operate continuously, or may be pulsed in synchronism with digital data input. Moreover, the laser 454 may be "phase-jittered" to avoid interference effects at the detector 468.

Referring now to FIG. 26, there is schematically shown a further embodiment 500 of the invention in the form of an electrical pulse analyzer. The pulse analyzer 500 incorporates a waveguide array 502 indicated by parallel electrode lines $502_1$ to $502_5$. The array 502 receives pulsed light 504 from a pulsed laser via an amplitude adjuster (not shown). As previously described with reference to FIG. 25, the waveguide array 502 is arranged for electro-absorption of light in individual waveguides, the wavelength of the laser being in the neighborhood of the band edge of the waveguide material. Light is output from the waveguide array 502 at an output (crystal cleavage) plane 506, and is imaged by a lens 508 on to a linear detector diode array 510. The lens 508 is distant twice its focal length both from the output plane 506 and the detector array 510. Consequently, real images of the waveguide outputs in the plane 506 are formed at respective detector diodes in the array 510.

Radio frequency (RF) inductors $512_1$ to $512_4$ of a chain 512 connect adjacent pairs of electrodes $502_n$ and $502_{n+1}$ (n=1 to 4). The uppermost RF inductor $512_1$ is connected to an RF signal input 514.

The pulse analyzer 500 operates as follows. An RF signal applied to the input 514 propagates along the inductor chain 512 at a velocity given by:

$$V = ((LC)^{-\tfrac{1}{2}}$$

where L and C are respectively the inductance and capacitance of the chain per unit length, and the units of V are the length over which L and C are measured per second. The value of C is dominated by the capacitance of the waveguides $502_1$ etc to which the chain 512 is connected. The value of L may be adjusted by varying the length of and/or coiling individual inductors $512_1$ etc. It is necessary that the artificial delay line formed by these L and C components be substantially non-dispersive, i.e. that V be independent of RF signal frequency in the band of interest.

Since an RF signal input at 514 requires a finite time to propagate along the inductor chain 512, at any instant a sample section of the signal waveform appears distributed over the chain length. A pulse from the laser 504 is divided equally between the waveguides 502 by the amplitude adjuster 505. Each laser pulse division is attenuated by electro-absorption in the respective waveguide to a degree dependent on the RF signal level at that waveguide. Consequently, the waveguide outputs in the plane 506 are attenuated in accordance with the instantaneous RF waveform. The dectors in the array 510 receive respective waveguide outputs, and therefore generate output signals attenuated in accordance with the RF waveform. The detector array output is therefore a sample of the RF waveform, provided that the laser pulse length is much shorter than the time during which signal levels at individual waveguides change appreciably. A one picosecond laser pulse would enable RF frequency components well above one GHz to be sampled. The pulse analyzer 500 consequently provides a means for sampling very high frequency waveforms. Furthermore, the analyzer 500 is free of electronic transients which corrupt sampled signals in conventional all-electronic equivalents.

Repetitive RF waveforms may be sampled in the analyzer 500 with the aid of a laser 504 pulsed in synchronism with the waveform repetition. Multiple samples obtained in this way may then be integrated together electronically to improve signal-to-noise ratio.

As has been said, the pulse analyzer 500 incorporates a lens 508 to image light on the detector array 510. The lens may be arranged less than twice its focal length from the waveguide outputs to provide optical magnification. Alternatively, individual detectors may be arranged directly at respective waveguide outputs to avoid the need for imaging optics.

The invention may also provide a time integrating correlator. In apparatus terms, this is similar to the pulse analyzer 500 with the following adaptations. The laser 504 has a much longer pulse length, and may be continuous as will be described. It is biased about a midpoint of its intensity output range, and is intensity modulated about this by an input reference signal. An outmost waveguide of the array 502 is unconnected to the inductor chain 512, and all waveguides in the array 502 are biased to the midpoint of their operation (50% attenuation). The detectors in the array each receive light from respective waveguides. The detector associated with the waveguide unconnected to the inductor chain provides a reference signal with which all other detector output signals are compared by a comparator array (not shown).

A waveform is input to the inductor chain 512 as previously described, the waveform being corrupted by noise and interference. If the laser modulation is in synchronism with the signal on any one of the waveguides connected to the inductor chain, then a peak signal will appear on the detector associated therewith verifying the presence of the laser modulation reference signal waveform in the input waveform. The peak transmission of the waveguide modulator always coincides with a laser intensity maximum, and a transmission minimum coincides with a laser intensity minimum. The detectors may integrate their received optical powers for any convenient period, e.g. nanoseconds to seconds. Integration may be governed by the laser pulse length or by electronic integration of detector output. Noise and uncorrelated interference average to zero over a sufficiently long integration period.

Figure 27:
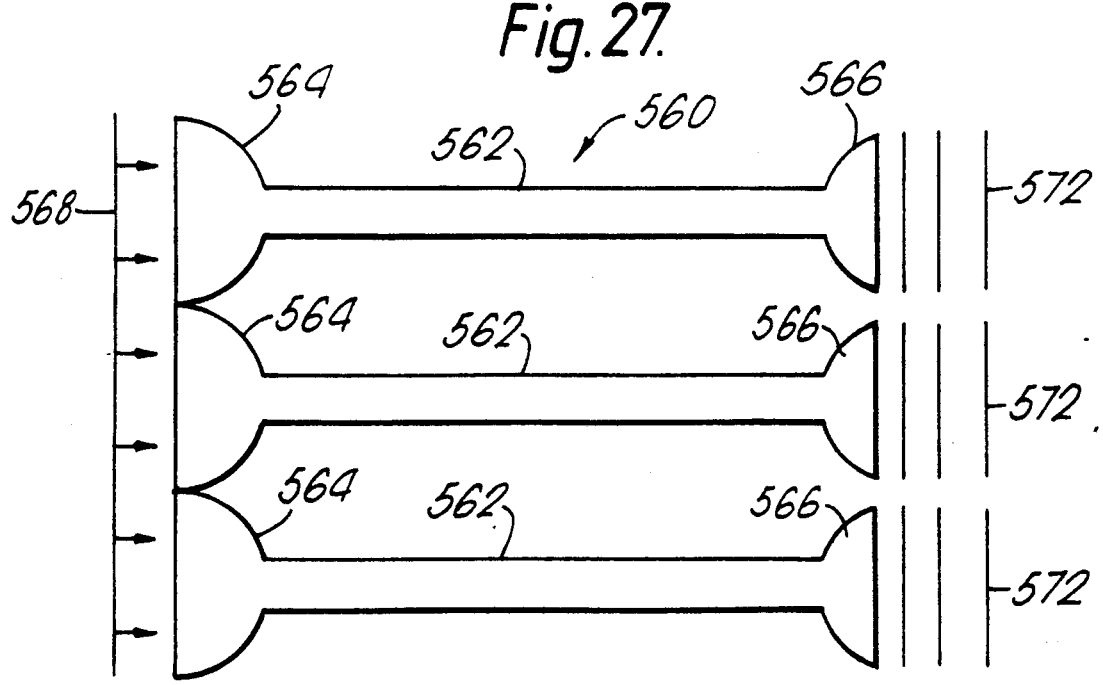
FIG. 27 illustrates parabolic waveguide horns for light input to and output from a device of the invention.

Referring now to FIG. 27, there is schematically shown a waveguide array structure 560 suitable for use in earlier embodiments of the invention. For illustrational clarity, the structure 560 is shown in greatly foreshortened form and is not to scale. It incorporates three waveguides 562, each of which has enlarged input and output regions or "horns" 564 and 566 of parabolic shape. The input horns 564 receive in common a laser light beam indicated by an arrowed wavefront 568. The output horns 566 generate plane light waves 572.

The use of parabolic input and output waveguide horns 564 and 566 provide a number of advantages. Whereas tapered waveguide horns are known, parabolic horns are more efficient and require a smaller waveguide length. The output horns 566 broaden the output beam 572 and thereby concentrate light energy in low-order spatial modes at the expense of unwanted higher modes. Moreover, the transition from waveguides 562 to output horns 566 occurs over a very small physical length, which reduces the possibility of mode conversion. The principal advantage of the waveguide horns 564 and 566 is that the effect of a continuous optical structure is simulated with reduced capacitance and without diffraction effects.

We claim:

1. An electro-optic waveguide device of multilayer construction including an array of electrically biasable waveguides of electro-refractive material, said device comprising:
    (a) a waveguide core layer having a refractive index and two light confinement layers sandwiching said core layer therebetween, each of said confinement layers having a refractive index lower than said core layer refractive index, said waveguide core layer comprising at least part of a diode structure and said core layer depletable of charge carriers under a reverse bias applied by means of said confinement layers;
    (b) means defining grooving at least partly through said waveguide core layer and for defining individual waveguides, said individual waveguides comprising said array;
    (c) a grooving medium included in said waveguide array having a refractive index at least 1.5 less than said waveguide core layer refractive index, said means defining grooving and said medium comprising a means for optically isolating adjacent waveguides;
    (d) a biasing means for each respective waveguide;
    (e) means for inhibiting output of unwanted spatial modes from said waveguides; and
    (f) said waveguides and said biasing means comprising a means for providing for radiation output form said waveguides to interfere and for generating a far field diffraction pattern having a main lobe steerable across an output region of the device.

2. A device according to claim 1 wherein said waveguides have a width less than $5\lambda$ and centers of adjacent waveguides are less than $20\lambda$ apart, where $\lambda$ is a free space operating wavelength of said device.

3. A device according to claim 1 wherein said grooving medium is air.

4. A device according to claim 1 wherein said device is at least partly constructed of successively disposed semiconductor material layers of the $Ga_xAl_{1-x}As$ system.

5. A device according to claim 4, wherein on of the light confinement layers comprises a Schottky contact to said waveguide core layer.

6. A device according to claim 4, wherein said waveguide core layer is comprised of substantially undoped GaAs and said light confinement layers are comprised of GaAlAs and have mutually opposite conductivity type.

7. A device according to claim 4, wherein one of the light confinement layers is common to each of said waveguides.

8. A device according to claim 4, wherein said waveguide core layer includes a common crystal cleavage plane and each of said waveguides includes a respective light output surface region in said common crystal cleavage plane.

9. An electro-optic waveguide device of multilayer construction including an array of electrically biasable waveguides of electro-refractive material, said device comprising:
    (a) a waveguide core layer having a refractive index and two light confinement layers sandwiching said core layer therebetween, each of said confinement layers having a refractive index lower than said core layer refractive index, said waveguide core layer comprising at least part of a diode structure and said core layer depletable of charge carriers under a reverse bias applied by means of said confinement layers;
    (b) means defining grooving at least partly through said waveguide core layer and for defining individual waveguides, said individual waveguides comprising said array;
    (c) a grooving medium included in said waveguide array having a refractive index at least 1.5 less than said waveguide core layer refractive index, said means defining grooving and said medium comprising a means for optical coupling between adjacent waveguides;

(d) means for inhibiting output of unwanted spatial modes from said waveguides; and (e) means for biasing said waveguides, said means for biasing said waveguides comprising respective bond pads and conductors connected thereto, said bond pads being located around a region of a device containing the waveguides and said conductors extending over a light input region of the device.

10. A device according to claim 9, wherein said waveguides and said biasing means comprise a means for generating a far field diffraction pattern at an input region of an array of receive waveguides, said device further including receive waveguides, said pattern having a main diffraction lobe receivable by any one of said receive waveguides and steerable across said array of receive waveguides.

11. A device according to claim 10 wherein the electro-optic waveguide device is comprised of a semiconductor multilayer structure.

12. A device according to claim 11, wherein said receive waveguides have a minimum relative spacing at said input region.

13. An electro-optic waveguide device of multilayer construction including an array of electrically biasable waveguides of electro-refractive material, said device comprising:

(a) a waveguide core layer having a refractive index and two light confinement layers sandwiching said core layer therebetween, each of said confinement layers having a refractive index lower than said core layer refractive index, said waveguide core layer comprising at least part of a diode structure and said core layer depletable of charge carriers under a reverse bias applied by means of said confinement layers;

(b) means defining grooving at least partly through said waveguide core layer and for defining individual electro-optic waveguides, said individual electro-optic waveguides comprising said array;

(c) a grooving medium included in said waveguide array having a refractive index at least 1.5 less than said waveguide core layer refractive index, said means defining grooving and said medium comprising a means for inhibiting optical coupling between adjacent electro-optic waveguides;

(d) means for inhibiting output of unwanted spatial modes from said waveguides; and (e) an array of receive waveguides having an input region; and (f) said electro-optic waveguides comprising a means for generating a far field diffraction pattern at said input region of said array of receive waveguides, said diffraction pattern having a main diffraction lobe receivable by any one of the receive waveguides and steerable across said receive waveguide array.

14. A device according to claim 13 wherein the electro-optic waveguides and receive waveguides are formed as a semiconductor multilayer structure.

15. A device according to claim 14 wherein the receive waveguides have a minimum relative spacing at said input region.

16. An electro-optic waveguide device of multilayer construction including an array of electrically biasable waveguides of electro-refractive material, said device comprising:

(a) a waveguide core layer having a refractive index and two light confinement layers sandwiching said core layer therebetween, each of said confinement layers having a refractive index lower than said core layer refractive index, said waveguide core layer comprising at least part of a diode structure and said core layer depletable of charge carriers under a reverse bias applied by means of said confinement layers;

(b) means defining grooving at least partly through said waveguide core layer and for defining individual electro-optic waveguides, said individual electro-optic waveguides comprising said array;

(c) a grooving medium included in said waveguide array having a refractive index at least 1.5 less than said waveguide core layer refractive index, said means defining grooving and said medium comprising a means for inhibiting optical coupling between adjacent electro-optic waveguides;

(d) means for inhibiting output of unwanted spatial modes from said waveguides; and (e) a common analog voltage input;

(f) a signal processing means for providing a digital output corresponding to analog input voltage;

(g) a detector array, connected to said signal processing means, said detector array comprising detectors disposed along a path traversed by an electro-optic waveguide array output in response to voltage input variation; and (h) the number of electro-optic waveguides is m, each of said waveguides includes a respective bias electrode, each bias electrodes having a length nL, where n=1 to m and denotes the nth waveguide and electrode, and L is the length of a first electrode, the electrodes are connected to said common analog voltage input, said electro-optic waveguides and said bias electrodes comprising a means for providing said electro-optic waveguide array output focused together at said detector array.

17. A device according to claim 16 wherein said signal processing means includes comparing means for comparing each detector output signal with a reference signal level.

18. A device according to claim 16 wherein each of said electro-optic waveguides further includes a respective second bias electrode, said second bias electrodes comprising a means for producing a common electro-optic waveguide output focus under conditions of zero analog input voltage.

19. A device according to claim 16 wherein said detector array is two dimensional and coded to provide output binary words.

20. A device according to claim 19 wherein said detector array has a Gray-code format.

21. An electro-optic waveguide device of multilayer construction including an array of electrically biasable waveguides of electro-refractive material, said device comprising:

(a) an electro-absorbing waveguide core layer having a refractive index and two light confinement layers sandwiching said core layer therebetween, each of said confinement layers having a refractive index lower than said core layer refractive index, said waveguide core layer comprising at least part of a diode structure and said core layer depletable of charge carriers under a reverse bias applied by means of said confinement layers, wherein said waveguide core layer is comprised of an electro-absorbing material at a light source wavelength,;

(b) means defining grooving at least partly through said waveguide core layer and for defining individual electro-optic waveguides, said individual electro-optic waveguides comprising said array;

(c) a grooving medium included in said waveguide array having a refractive index at least 1.5 less than said waveguide core layer refractive index, said means defining grooving and said medium comprising a means for inhibiting optical coupling between adjacent electro-optic waveguides;

(d) means for inhibiting output of unwanted spatial modes from said waveguides;

(e) a light source means for providing light as an input to each of said waveguides, said light source means having a wavelength for which said waveguides are electro-absorbing;

(f) respective electrical biasing means associated with each of said waveguides, said biasing means being connected to a respective source of high and low voltages corresponding to a binary digit, and each said waveguide being switchable between opaque and transmitting states in response to voltage change of said associated biasing means, (g) light intensity weighting means, associated with said waveguides for weighting light beams transmitted by said waveguides with intensities weighted in accordance with a binary doubling scheme, and (h) detecting means for receiving and summing weighted output beam intensities from said waveguides and said weighting means, said detecting means including means for providing an analog output voltage corresponding to said sum.

22. An electro-optic waveguide device of kind incorporating an array of electrically biasable waveguides of electro-optic material, and wherein:

(a) the device is of multilayer construction, and includes a waveguide core layer sandwiched between two light confinement layers of lower refractive index, (b) the waveguide core layer is part of a diode structure and said core layer is depletable of charge carriers under reverse bias applied via the confinement layers, (c) grooving extends at least partly through the waveguide core layer to define individual waveguides of the array, the grooving containing a medium with refractive index at least 1.5 less than that of the waveguide core layer to inhibit optical coupling between adjacent waveguides, (d) the waveguides include means for inhibiting output of unwanted spatial modes, and (e) bias electrodes are associated with respective ones of said waveguides;

(f) respective radio frequency (RF) inductor means for connecting adjacent pairs of said bias electrodes, said respective inductor means are connected in series;

(g) an RF input is connected to said RF inductors;

(h) pulsed laser means for providing a light input to each of said waveguides, said laser means having a wavelength for which said waveguides are electro-absorbing, and (i) detector means for receiving pulsed laser light transmitted by respective ones of said waveguides and for providing respective signal sample values in accordance with an RF signal distributed over said RF inductors.

23. An electro-optic waveguide device of kind incorporating an array of electrically biasable waveguides of electro-optic material, and wherein:

(a) the device is of multilayer construction, and includes a waveguide core layer sandwiched between two light confinement layers of lower refractive index, (b) the waveguide core layer is part of a diode structure and said core layer is depletable of charge carriers under reverse bias applied via the confinement layers, (c) grooving extends at least partly through the waveguide core layer to define individual waveguides of the array, the grooving containing a medium with refractive index at least 1.5 less than that of the wave guide core layer to inhibit optical coupling between adjacent waveguides, (d) the waveguides include means for inhibiting output of unwanted spatial modes, and a parabolic input region and a parabolic output region terminate respective ends of each of said waveguides.

24. An electro-optic waveguide device of kind incorporating an array of electrically biasable waveguides of electro-optic material, and wherein:

(a) the device is of multilayer construction, and includes a waveguide core layer sandwiched between two light confinement layers of lower refractive index, (b) the waveguide core layer is part of a diode structure and said core layer is depletable of charge carriers under reverse bias applied via the confinement layers, (c) grooving extends at least partly through the waveguide core layer to define individual waveguides of the array, the grooving containing a medium with refractive index at least 1.5 less than that of the waveguide core layer and providing substantial optical isolation between adjacent waveguides, (d) the waveguides include means for inhibiting output of unwanted spatial modes, (e) radiation source means for providing an input to said waveguides;

(f) biasing means are associated with said waveguides, said biasing means and said waveguides being arranged in combination to provide interfering radiation outputs generating a far field diffraction pattern with a steerable lobe; and (g) a receiving means is disposed to receive said steerable lobe.

25. An electro-optic waveguide device of kind incorporating an array of electrically biasable waveguides of electro-optic material, and wherein:

(a) the device is of multilayer construction, and includes a waveguide core layer sandwiched between two light confinement layers of lower refractive index, (b) the waveguide core layer is part of a diode structure and said core layer is depletable of charge carriers under reverse bias applied via the confinement layers, (c) grooving extends at least partly through the waveguide core layer to define individual waveguides of the array, the grooving containing a medium with refractive index at least 1.5 less than that of the waveguide core layer to inhibit optical coupling between adjacent waveguides, (d) the waveguides include means for inhibiting output of unwanted spatial modes, (e) radiation source means for providing a radiation input to said waveguides, and (f) biasing means, associated with said waveguides for non-linearly varying in phase said waveguide radiation output and for generating at least one curved output radiation wavefront.

26. An electro-optic waveguide device including:

(a) a multilayer structure comprising an electrorefractive waveguide core layer sandwiched between two light confinement layers, said core layer;
  (i) having a higher refractive index than said confinement layers;
  (ii) comprising at least part of a diode structure, and
  (iii) being depletable of charge carriers under reverse bias applied by means of said confinement layers;

(b) individual waveguides defined in said multilayer structure by a medium within grooves between adjacent waveguides, said grooves extending at least partly through said core layer, said waveguides forming an array comprising means for inhibiting unwanted spatial mode outputs and said medium having a refractive index at least 1.5 less than said core layer refractive index and comprising a means for substantially optically isolating adjacent waveguides;

(c) biasing means for said waveguides, said biasing means and said waveguide array comprising a means for generating a far field diffraction pattern having a steerable lobe in response to monochromatic light input to each of said waveguides; and (d) an output region located to receive said steerable lobe.

* * * * *